United States Patent
Huang et al.

(10) Patent No.: US 11,188,740 B2
(45) Date of Patent: Nov. 30, 2021

(54) TWO-PASS OMNI-DIRECTIONAL OBJECT DETECTION

(71) Applicant: QUALCOMM incorporated, San Diego, CA (US)

(72) Inventors: Chun-Ting Huang, San Diego, CA (US); Lei Wang, Clovis, CA (US); Zhen Wang, San Diego, CA (US); Xiaoliang Bai, San Diego, CA (US); Ning Bi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/719,900

(22) Filed: Dec. 18, 2019

(65) Prior Publication Data

US 2021/0192182 A1 Jun. 24, 2021

(51) Int. Cl.
*G06K 9/00* (2006.01)
*G06T 7/73* (2017.01)
*G06K 9/46* (2006.01)
*G06K 9/62* (2006.01)

(52) U.S. Cl.
CPC ..... *G06K 9/00228* (2013.01); *G06K 9/00268* (2013.01); *G06K 9/4642* (2013.01); *G06K 9/6267* (2013.01); *G06T 7/73* (2017.01); *G06T 2207/20084* (2013.01)

(58) Field of Classification Search
CPC ............ G06K 9/00228; G06K 9/4642; G06K 9/6267; G06K 9/00268; G06T 7/73; G06T 2207/20084
See application file for complete search history.

(56) References Cited

U.S. PATENT DOCUMENTS

| | | | | |
|---|---|---|---|---|
| 9,224,034 | B2* | 12/2015 | Steinberg | G06K 9/00228 |
| 2019/0311227 | A1* | 10/2019 | Kriegman | G06K 9/00442 |
| 2020/0104033 | A1* | 4/2020 | Ho | G06F 21/32 |
| 2020/0194108 | A1* | 6/2020 | Podilchuk | A61B 5/7267 |
| 2020/0265604 | A1* | 8/2020 | Lin | G06T 7/73 |
| 2020/0279128 | A1* | 9/2020 | Hoehne | G06K 9/623 |
| 2020/0311844 | A1* | 10/2020 | Luo | G06Q 50/265 |
| 2021/0012093 | A1* | 1/2021 | Rao | G06T 9/002 |

OTHER PUBLICATIONS

Lawrence et al., "Face Recognition: A Convolutional Neural-Network Approach", IEEE Transactions on Neural Networks, vol. 8, No. 1, Jan. 199 (Year: 1997).*

* cited by examiner

*Primary Examiner* — Qian Yang
(74) *Attorney, Agent, or Firm* — QUALCOMM Incorporated

(57) ABSTRACT

Methods, systems, and devices for object detection are described. A device may receive an image, and detect, via a first stage of a cascade neural network, object recognition information over one or more angular orientations during a first pass. The device may determine, via a second stage of the cascade neural network, a confidence score associated with one or more of the candidate object in the image, the candidate bounding box associated with the candidate object in the image, or one or more object features of the candidate object in the image, or an orientation of the candidate object in the image, or a combination thereof. The device may identify, via a third stage of the cascade neural network, whether to detect the object recognition information during a second pass based on the confidence score satisfying a threshold.

20 Claims, 9 Drawing Sheets

TWO-PASS OMNI-DIRECTIONAL OBJECT DETECTION

TECHNICAL FIELD

The following relates generally to object detection, and more specifically to a two-pass omni-directional object detection.

BACKGROUND

Multimedia systems are widely deployed to provide various types of multimedia communication content such as voice, video, packet data, messaging, broadcast, and so on. These multimedia systems may be capable of processing, storage, generation, manipulation and rendition of multimedia information. Examples of multimedia systems include wireless communications systems, entertainment systems, information systems, virtual reality systems, model and simulation systems, and so on. These systems may employ a combination of hardware and software technologies to support processing, storage, generation, manipulation and rendition of multimedia information, for example, such as capture devices, storage devices, communication networks, computer systems, and display devices. As demand for multimedia communication efficiency increases, some multimedia systems, may fail to provide satisfactory multimedia operations for multimedia communications, and thereby may be unable to support high reliability or low latency multimedia operations, among other examples.

SUMMARY

Various aspects of the described techniques relate to configuring a device to support a two-pass omni-directional object detection. For example, the described techniques may be used to configure the device to use learning-based recognition algorithms to enable the recognition of objects at various orientations. In some examples, learning-based recognition algorithms may include machine learning networks, such as neural networks, convolutional neural networks, and deep-neural networks, among other examples. In some examples, the described techniques may be used to configure the device to use a cascaded convolutional neural network model.

The cascaded convolutional neural network model may have multiple cascades (e.g., two or three cascades or stages) that may enable object recognition at various orientations. As such, use of the cascaded convolutional neural network model may allow the device to perform object detection over multiple orientations (e.g., 0°, 90°, 180°, and 270°) of an image. Based on the results of the cascaded convolutional neural network, the device may determine and output a value (e.g., a confidence score, a confidence level) associated with a candidate object in the image. For example, the value may be a confidence score based on the cascaded convolutional neural network's confidence associated with the candidate object in the image.

The device may compare the value to a threshold and determine whether to process the image using an additional pass of the cascaded convolutional neural network (e.g., process the image using a second pass of the three stages). For example, for an output value that is less than the threshold (e.g., associated with boundary cases), the device may process the image using a second pass of the cascaded convolutional neural network. In an example, prior to performing the second pass, the device may adjust the angular rotation of the image or adjust the angular rotation of one or more candidate object regions. For example, by rotating the image or the candidate object regions prior to the second pass, the device may perform object detection in the second pass using different orientations of an image compared to the first pass. In some examples, by performing object detection in the second pass based on the rotated image, the device may eliminate any boundary cases identified during the first pass. The described techniques may include features for improvements to power consumption and, in some examples, may promote enhanced efficiency for high reliability and low latency object detection operations, among other benefits.

A method of object detection at a device is described. The method may include receiving an image, detecting, via a first stage of a cascade neural network, object recognition information over one or more angular orientations during a first pass, the object recognition information including one or more of a candidate object in the image or a candidate bounding box associated with the candidate object in the image, determining, via a second stage of the cascade neural network, a confidence score associated with one or more of the candidate object in the image, the candidate bounding box associated with the candidate object in the image, or one or more object features of the candidate object in the image, or an orientation of the candidate object in the image, or a combination thereof, identifying, via a third stage of the cascade neural network, whether to detect the object recognition information during a second pass based on the confidence score satisfying a threshold, and processing the image based on identifying whether to detect the object recognition information during the second pass.

An apparatus for object detection is described. The apparatus may include a processor, memory coupled with the processor, and instructions stored in the memory. The instructions may be executable by the processor to cause the apparatus to receive an image, detect, via a first stage of a cascade neural network, object recognition information over one or more angular orientations during a first pass, the object recognition information including one or more of a candidate object in the image or a candidate bounding box associated with the candidate object in the image, determine, via a second stage of the cascade neural network, a confidence score associated with one or more of the candidate object in the image, the candidate bounding box associated with the candidate object in the image, or one or more object features of the candidate object in the image, or an orientation of the candidate object in the image, or a combination thereof, identify, via a third stage of the cascade neural network, whether to detect the object recognition information during a second pass based on the confidence score satisfying a threshold, and process the image based on identifying whether to detect the object recognition information during the second pass.

Another apparatus for object detection is described. The apparatus may include means for receiving an image, detecting, via a first stage of a cascade neural network, object recognition information over one or more angular orientations during a first pass, the object recognition information including one or more of a candidate object in the image or a candidate bounding box associated with the candidate object in the image, determining, via a second stage of the cascade neural network, a confidence score associated with one or more of the candidate object in the image, the candidate bounding box associated with the candidate object in the image, or one or more object features of the candidate object in the image, or an orientation of the candidate object in the image, or a combination thereof, identifying, via a third stage of the cascade neural network, whether to detect the object recognition information during a second pass based on the confidence score satisfying a threshold, and processing the image based on identifying whether to detect the object recognition information during the second pass.

A non-transitory computer-readable medium storing code for object detection at a device is described. The code may include instructions executable by a processor to receive an image, detect, via a first stage of a cascade neural network, object recognition information over one or more angular orientations during a first pass, the object recognition information including one or more of a candidate object in the image or a candidate bounding box associated with the candidate object in the image, determine, via a second stage of the cascade neural network, a confidence score associated with one or more of the candidate object in the image, the candidate bounding box associated with the candidate object in the image, or one or more object features of the candidate object in the image, or an orientation of the candidate object in the image, or a combination thereof, identify, via a third stage of the cascade neural network, whether to detect the object recognition information during a second pass based on the confidence score satisfying a threshold, and process the image based on identifying whether to detect the object recognition information during the second pass.

In some examples of the method, apparatuses, and non-transitory computer-readable medium described herein for determining the confidence score may include operations, features, means, or instructions for determining the confidence score during the first pass.

Some examples of the method, apparatuses, and non-transitory computer-readable medium described herein may further include operations, features, means, or instructions for identifying whether to detect the object recognition information includes identifying, during the first pass, whether to detect the object recognition information during the second pass.

Some examples of the method, apparatuses, and non-transitory computer-readable medium described herein may further include operations, features, means, or instructions for adjusting, based on the orientation of the candidate object in the image, an orientation of one or more of the candidate bounding box associated with the candidate object in the image or the candidate object in the image, and detecting the object recognition information during the second pass based on the adjusting, where processing the image may be based on detecting the object recognition information during the second pass.

In some examples of the method, apparatuses, and non-transitory computer-readable medium described herein, adjusting the orientation of one or more of the candidate bounding box associated with the candidate object in the image or the candidate object in the image may include operations, features, means, or instructions for adjusting an orientation of the candidate bounding box in a first direction, and adjusting an orientation of the candidate object in a second direction different than the first direction.

Some examples of the method, apparatuses, and non-transitory computer-readable medium described herein may further include operations, features, means, or instructions for detecting, via the first stage of a cascade neural network, additional object recognition information over one or more angular orientations during the first pass, the additional object recognition information including one or more of additional candidate objects in the image or additional candidate bounding boxes associated with the additional candidate objects in the image, where determining, via the second stage of the cascade neural network, the confidence score may be based on one or more of the additional candidate objects in the image or the additional candidate bounding boxes associated with the additional candidate objects in the image.

Some examples of the method, apparatuses, and non-transitory computer-readable medium described herein may further include operations, features, means, or instructions for determining a classification score of the object recognition information including one or more of the candidate object in the image or the candidate bounding box associated with the candidate object in the image, and determining an additional classification score of the additional object recognition information including one or more of the additional candidate objects in the image or the additional candidate bounding boxes associated with the additional candidate objects in the image, where processing the image may be based on one or more of the classification score or the additional classification score.

Some examples of the method, apparatuses, and non-transitory computer-readable medium described herein may further include operations, features, means, or instructions for determining an intersection over union by comparing the classification score and the additional classification score, and determining that the intersection over union satisfies a classification threshold, where processing the image may be based on the intersection over union satisfying the classification threshold.

Some examples of the method, apparatuses, and non-transitory computer-readable medium described herein may further include operations, features, means, or instructions for determining that the confidence score satisfies the threshold, and detecting the object recognition information during the second pass based on the confidence score satisfying the threshold, where processing the image includes detecting the object recognition information during the second pass.

Some examples of the method, apparatuses, and non-transitory computer-readable medium described herein may further include operations, features, means, or instructions for determining a second confidence score associated with one or more of the candidate object in the image, the candidate bounding box associated with the candidate object in the image, the one or more object features of the candidate object in the image, or an orientation of the candidate object in the image, or a combination thereof during the second pass, comparing the confidence score and the second confidence score, and outputting a representation of one or more of the confidence score or the second confidence score based on the comparing, where processing the image includes outputting one or more of the confidence score or the second confidence score.

Some examples of the method, apparatuses, and non-transitory computer-readable medium described herein may further include operations, features, means, or instructions for determining that the confidence score satisfies the threshold, where processing the image includes authenticating the object recognition information based on the confidence score satisfying the threshold.

Some examples of the method, apparatuses, and non-transitory computer-readable medium described herein may further include operations, features, means, or instructions for determining that the confidence score satisfies the threshold, where processing the image includes outputting a representation of the object recognition information based at least in part on the confidence score satisfying the threshold.

In some examples of the method, apparatuses, and non-transitory computer-readable medium described herein, the candidate object in the image includes a candidate face in the image, and the one or more object features of the candidate object in the image include one or more facial features associated with the candidate face.

DETAILED DESCRIPTION

Figure 1:
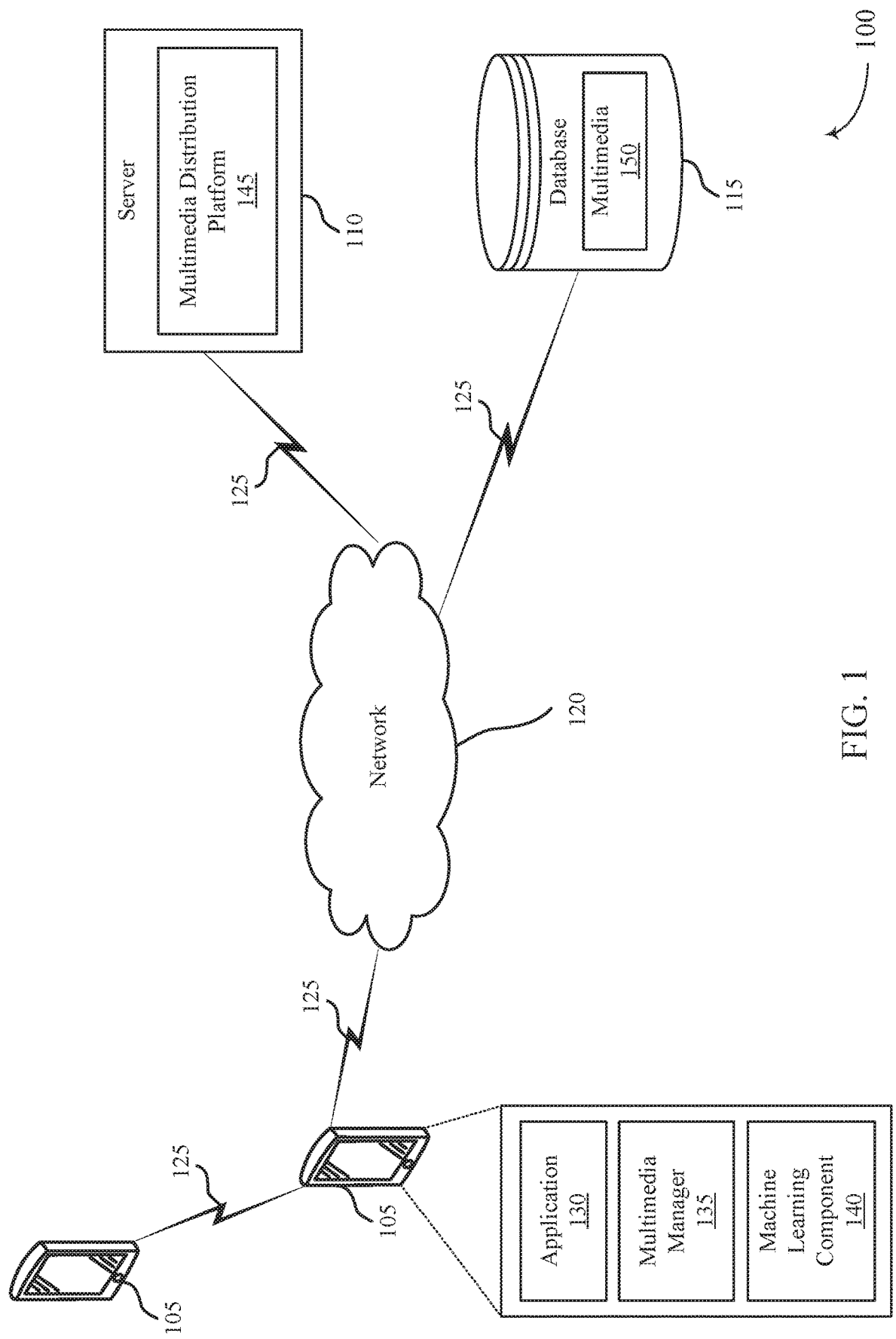
FIG. 1 illustrates an example of a multimedia system for object detection that supports a two-pass omni-directional object detection in accordance with aspects of the present disclosure.

Various aspects of the described techniques relate to configuring a device to support a two-pass omni-directional object detection. In some examples, a device may be configured to use a recognition-based algorithm, such as object detection, to determine a presence of an object in an image, or a video, or both. Recognition-based algorithms may be learning-based recognition algorithms to enable the device to determine object recognition information. In some examples, learning-based recognition algorithms may include machine learning networks, such as neural networks, convolutional neural networks, and deep-neural networks, among other examples. In some examples, the described techniques may be used to configure the device to use a cascaded convolutional neural network model.

In some examples, objects in an image, or a video, or both may have various orientations or rotations over a number of directions. Some devices using learning-based recognition algorithms may experience a decrease in accuracy when attempting to determine object recognition information on an image or a video, or both that have objects with various orientations or rotations. Some learning-based recognition algorithms, such as convolutional neural network-based recognition algorithms may support non-linear feature learning. In some examples, some devices that support learning-based recognition algorithms may have to train the algorithms (i.e., learning models) to acquire rotation-invariant detection ability by processing large amounts of data augmentation (e.g., object repositioning according to different rotated angles) and a high number of parameters into the learning model structure. Although training the learning-based recognition algorithms to acquire rotation-invariant detection ability may be effective for object recognition information on an image or a video, or both that have objects with various orientations or rotations, such training may increase overhead and use or device resources (e.g., processor resources, memory resources), which may be unfavorable in device applications, such as mobile applications. As demand for more efficient learning models increases, some learning-based recognition algorithms may be inefficient and consume an unnecessary amount of device resources.

Various aspects of the described techniques relate to configuring a device to use learning-based recognition algorithms to enable the recognition of objects at various orientations. For example, the described techniques may be used to configure the device to use a cascaded convolutional neural network model. The cascaded convolutional neural network model may have multiple cascades (e.g., three cascades or stages) that may enable object recognition at various orientations. As such, use of the cascaded convolutional neural network model may allow the device to perform object detection over multiple orientations (e.g., 0°, 90°, 180°, and 270°) of an image. Based on the results of the cascaded convolutional neural network, the device may determine and output a value (e.g., a confidence score, a confidence level) associated with a candidate object in the image. For example, the value may be a confidence score based on the cascaded convolutional neural network's confidence associated with the candidate object in the image.

The device may compare the value to a threshold and determine whether to process the image using an additional pass of the cascaded convolutional neural network (e.g., process the image using a second pass of the three stages). For example, for an output value that is less than the threshold (e.g., associated with boundary cases), the device may process the image using a second pass of the cascaded convolutional neural network. In an example, prior to performing the second pass, the device may adjust the angular rotation of the image or adjust the angular rotation of one or more candidate object regions. For example, by rotating the image or the candidate object regions prior to the second pass, the device may perform object detection in the second pass using different orientations of an image compared to the first pass. In some examples, by performing object detection in the second pass based on the rotated image, the device may eliminate any boundary cases identified during the first pass. The described techniques may include features for improvements to power consumption and, in some examples, may promote enhanced efficiency for high reliability and low latency object detection operations, among other benefits.

Particular aspects of the subject matter described in this disclosure may be implemented to realize one or more of the following potential advantages. The techniques employed by the described devices may provide benefits and enhancements to the operation of the devices. For example, operations performed by the described devices may provide improvements to object detection, and more specifically to omni-directional object detection supportive of recognition information. In some examples, configuring the described devices with the recognition of objects at various orientations using multiple stages and multiple passes of a machine learning network may support improvements to recognition accuracy and efficiency, and, in some examples, may promote reduced execution times and processor overhead for object detection, among other benefits.

Aspects of the disclosure are initially described in the context of a multimedia system. Aspects of the disclosure are further illustrated by and described with reference to apparatus diagrams, system diagrams, and flowcharts that relate to a two-pass omni-directional object detection.

FIG. 1 illustrates a multimedia system 100 for a device that supports a two-pass omni-directional object detection in accordance with aspects of the present disclosure. The multimedia system 100 may include devices 105, a server 110, and a database 115. Although the multimedia system 100 illustrates two devices 105, a single server 110, a single database 115, and a single network 120, the present disclosure applies to any multimedia system architecture having one or more devices 105, servers 110, databases 115, and networks 120. The devices 105, the server 110, and the database 115 may communicate with each other and exchange information that supports a two-pass omni-directional object detection, such as multimedia packets, multimedia data, or multimedia control information, via network 120 using communications links 125. In some examples, a portion or all of the techniques described herein supporting a two-pass omni-directional object detection may be performed by the devices 105 or the server 110, or both.

A device 105 may be a cellular phone, a smartphone, a personal digital assistant (PDA), a wireless communication device, a handheld device, a tablet computer, a laptop computer, a cordless phone, a display device (e.g., monitors), another device, or any combination thereof that supports various types of communication and functional features related to multimedia (e.g., transmitting, receiving, broadcasting, streaming, sinking, capturing, storing, and recording multimedia data) A device 105 may, additionally or alternatively, be referred to by those skilled in the art as a user equipment (UE), a user device, a smartphone, a Bluetooth device, a device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, or some other suitable terminology. In some examples, the devices 105 may also be able to communicate directly with another device (e.g., using a peer-to-peer (P2P) or device-to-device (D2D) protocol). For example, a device 105 may be able to receive from or transmit to another device 105 variety of information, such as instructions or commands (e.g., multimedia-related information).

The devices 105 may include an application 130, a multimedia manager 135, and a machine learning component 140. While the multimedia system 100 illustrates the devices 105 including the application 130, the multimedia manager 135, and the machine learning component 140, these features may be optional for the devices 105. In some examples, the application 130 may be a multimedia-based application that can receive (e.g., download, stream, broadcast) from the server 110, database 115 or another device 105, or transmit (e.g., upload) multimedia data to the server 110, the database 115, or to another device 105 via using communications links 125.

The multimedia manager 135 may be part of a general-purpose processor, a digital signal processor (DSP), an image signal processor (ISP), a central processing unit (CPU), a graphics processing unit (GPU), a microcontroller, an application-specific integrated circuit (ASIC), a field-programmable gate array (FPGA), a discrete gate or transistor logic component, a discrete hardware component, or any combination thereof, or other programmable logic device, discrete gate or transistor logic, discrete hardware components, or any combination thereof designed to perform the functions described in the present disclosure, or the like. For example, the multimedia manager 135 may process multimedia (e.g., image data, video data, audio data) from and write multimedia data to a local memory of the device 105 or to the database 115.

The multimedia manager 135 may also be configured to provide multimedia enhancements, multimedia restoration, multimedia analysis, multimedia compression, multimedia streaming, and multimedia synthesis, among other functionality. For example, the multimedia manager 135 may perform white balancing, cropping, scaling (e.g., multimedia compression), adjusting a resolution, multimedia stitching, color processing, multimedia filtering, spatial multimedia filtering, artifact removal, frame rate adjustments, multimedia encoding, multimedia decoding, and multimedia filtering. By further example, the multimedia manager 135 may process multimedia data to support a two-pass omni-directional object detection, according to the techniques described herein. For example, the multimedia manager 135 may employ the machine learning component 140 to process content of the application 130.

Figure 8:
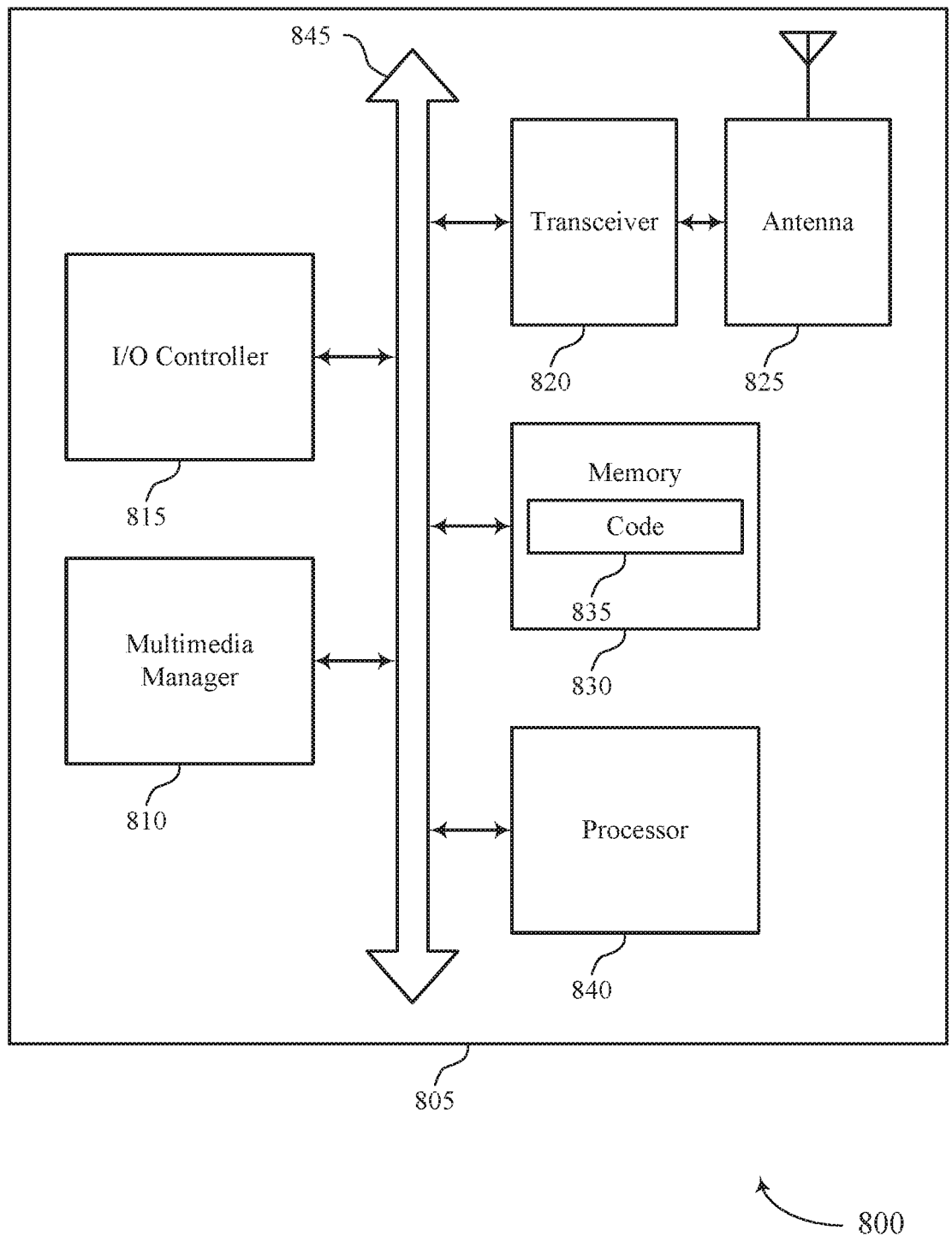
FIG. 8 shows a diagram of a system including a device that supports a two-pass omni-directional object detection in accordance with aspects of the present disclosure.

The machine learning component 140 may be implemented by aspects of a processor, for example, such as processor 840 described in FIG. 8. The machine learning component 140 may include a machine learning network (e.g., a neural network, a deep neural network, a convolutional neural network, a cascaded convolutional neural network, a trained neural network, etc.). In some examples, the machine learning component 140 may perform learning-based object recognition processing on content (e.g., multimedia content, such as image frames or video frames) of the application 130 to support a two-pass omni-directional object detection according to the techniques described herein.

Various aspects of the described techniques relate to configuring the device 105 to use learning-based recognition algorithms to enable the recognition of objects at various orientations. In some examples, the device 105 may include the machine learning component 140, which may be an example of one or more machine learning networks, such as neural networks, convolutional neural networks, cascaded convolutional neural networks, and deep neural networks. The machine learning component 140 may enable recognition of objects at various orientations in an image or a video, or both (e.g., objects with various roll angles). In some examples, the machine learning component 140 may perform object detection on an input image or an input video, or both, such as from the application 130 or the multimedia manager 135.

The machine learning component 140 may perform object detection from one or more angular positions of an image to detect objects with a variety of orientations or roll angles in the image. The machine learning component 140 may perform operations of a machine learning network, such as a cascaded convolutional neural network. For example, the machine learning component 140 may include multiple stages, and each stage may be associated with a different learning-based network. In some examples, the machine learning component 140 may include a cascaded convolutional neural network inclusive of multiple learning-based networks (e.g., three (3) learning-based networks) where each network corresponds to a different cascade of the cascaded convolutional neural network. In some examples, the three stages may include a detection stage, a refinement stage, and an output stage.

The multimedia manager 135 or the machine learning component 140, or both may provide improvements in omni-directional object detection for the devices 105. Furthermore, the techniques described herein may provide benefits and enhancements to the operation of the devices 105. For example, by employing a machine learning network with multiple cascaded networks, the operational characteristics, such as overhead, model size, power consumption, processor utilization (e.g., DSP, CPU, GPU, ISP processing utilization), and memory usage of the devices 105 may be reduced. The techniques described herein may also increase object detection efficiency in the devices 105 by reducing latency associated with processes related to object detection of rotated objects.

The server 110 may be a data server, a cloud server, a server associated with a multimedia subscription provider, proxy server, web server, application server, communications server, home server, mobile server, or any combination thereof. The server 110 may in some examples include a multimedia distribution platform 145. The multimedia distribution platform 145 may allow the devices 105 to discover, browse, share, and download multimedia via network 120 using communications links 125, and therefore provide a digital distribution of the multimedia from the multimedia distribution platform 145. As such, a digital distribution may be a form of delivering media content such as audio, video, images, without the use of physical media but over online delivery mediums, such as the Internet. For example, the devices 105 may upload or download multimedia-related applications for streaming, downloading, uploading, processing, enhancing, etc. multimedia (e.g., images, audio, video). The server 110 may also transmit to the devices 105 a variety of information, such as instructions or commands (e.g., multimedia-related information) to download multimedia-related applications on the device 105.

The database 115 may store a variety of information, such as instructions or commands (e.g., multimedia-related information). For example, the database 115 may store multimedia 150. The device 105 may support a two-pass omni-directional object detection associated with the multimedia 150. The device 105 may retrieve the stored data from the database 115 via the network 120 using communication links 125. In some examples, the database 115 may be a relational database (e.g., a relational database management system (RDBMS) or a Structured Query Language (SQL) database), a non-relational database, a network database, an object-oriented database, or other type of database, that stores the variety of information, such as instructions or commands (e.g., multimedia-related information).

The network 120 may provide encryption, access authorization, tracking, Internet Protocol (IP) connectivity, and other access, computation, modification, and functions. Examples of network 120 may include any combination of cloud networks, local area networks (LAN), wide area networks (WAN), virtual private networks (VPN), wireless networks (using 802.11, for example), cellular networks (using third generation (3G), fourth generation (4G), long-term evolved (LTE), or new radio (NR) systems (e.g., fifth generation (5G)), etc. The network 120 may include the Internet.

The communications links 125 shown in the multimedia system 100 may include uplink transmissions from the device 105 to the server 110 and the database 115, and downlink transmissions, from the server 110 and the database 115 to the device 105. The wireless links 125 may transmit bidirectional communications and unidirectional communications. In some examples, the communication links 125 may be a wired connection or a wireless connection, or both. For example, the communications links 125 may include one or more connections, including but not limited to, Wi-Fi, Bluetooth, Bluetooth low-energy (BLE), cellular, Z-WAVE, 802.11, peer-to-peer, LAN, wireless local area network (WLAN), Ethernet, FireWire, fiber optic, and other connection types related to wireless communication systems.

Figure 2:
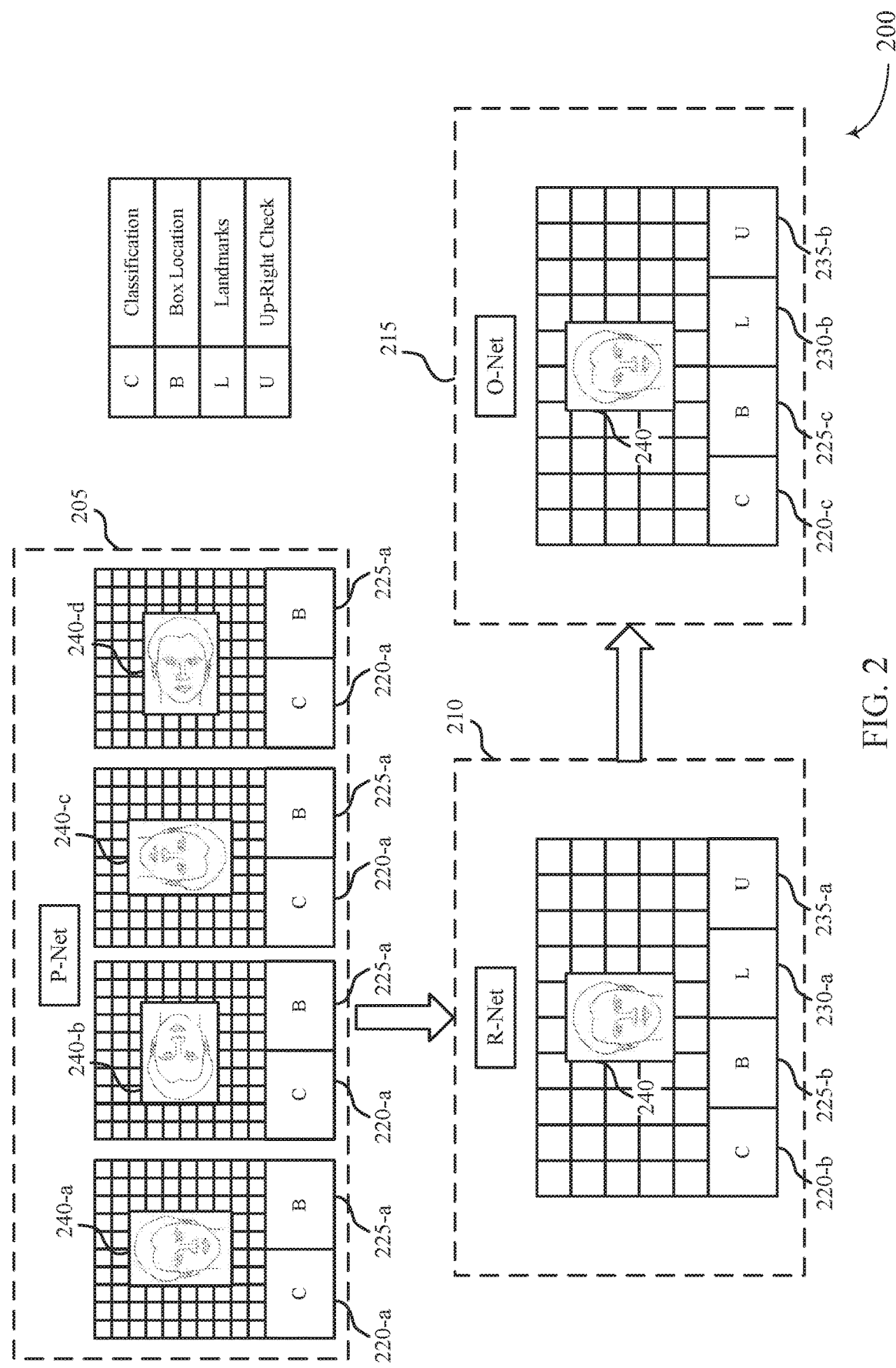
FIG. 2 illustrates an example of a machine learning network that supports a two-pass omni-directional object detection in accordance with aspects of the present disclosure.

FIG. 2 illustrates an example of a machine learning network 200 that supports a two-pass omni-directional object detection in accordance with aspects of the present disclosure. In some examples, the machine learning network 200 may implement aspects of the multimedia system 100. For example, the machine learning network 200 may be implemented by a multimedia manager or a machine learning component, or both, as described with reference to FIG. 1.

With reference to FIG. 1, in some examples, the devices 105 may use learning-based recognition algorithms to enable the recognition of objects at various orientations in a frame (e.g., an image frame, a video frame). In some examples, learning-based recognition algorithms may include the machine learning network 200, which may be a neural network, a convolutional neural network, or a deep-neural network. In some other examples, the machine learning network 200 may be a cascaded convolutional neural network model, which may support rotation invariant object detection. For example, using the machine learning network 200, the devices 105 may detect an object regardless of an orientation of the object in a frame (e.g., an image frame, a video frame).

In some examples, the devices 105 may detect objects with a roll angle. The devices 105 may perform object detection over one or more angular positions of a frame (e.g., an image frame, a video frame) by using a multi-stage learning-based recognition algorithm. For example, the devices 105 be configured to support the machine learning network 200, which may have multiple stages. In some examples, the machine learning network 200 may be a convolutional neural network having multiple stages (e.g., three stages) for object detection or object classification, or both. The multiple stages may include a first stage (e.g., a detection stage), a second stage (e.g., a refinement stage), and a third stage (e.g., an output stage).

In some examples, each stage of the multiple stages associated with the machine learning network 200 may have a separate learning network that may process a frame (e.g., an image frame, a video frame). For example, a first stage of the machine learning network 200 may have a first network 205 (e.g., a proposal network (P-Net)), a second stage of the machine learning network 200 may have a second network 210 (e.g., a refinement network (R-Net)), and a third stage of the machine learning network 200 may have a third network 215 (e.g., an output network (O-Net)). At each stage of the machine learning network 200, the devices 105 may output a number of results based on the frame processing performed by the network associated with the stage.

For example, at the first stage (e.g., using the first network 205), the devices 105 may perform object detection at one or more angular positions of the frame and detect a first classification score 220-a and a first bounding box location 225-a (e.g., a candidate bounding box location) for each of a number of candidate objects 240. At the second stage (e.g., using the second network 210), the devices 105 may refine the outputs of the first stage and output a second classification score 220-*b* (e.g., a confidence score) and a second bounding box location 225-*b*, as well as a number of landmarks 230-*a* and an up-right determination 235-*a*. At the third stage (e.g., using the third network 215), the devices 105 may refine the outputs of the second stage and output a third classification score 220-*c*, a third bounding box location 225-*c*, a third number of landmarks 230-*b*, and a third up-right determination 235-*b*. In some examples, the landmarks 230 may include one or more object features associated with the detected candidate objects. In some examples, at each of the stages, the devices 105 may determine a confidence score associated with each of the candidate objects 240.

The first stage may be a detection stage and may be associated with the first network 205. In some examples, the first network 205 may be an object proposal network (P-Net). For example, the devices 105 (e.g., using the first network 205) may detect a number of candidate objects 240 and provide the candidate objects 240 to the second stage. In some examples, the first network 205 may be a first cascade of a larger cascade of networks. For example, the machine learning network 200 may be an example of a cascaded convolutional neural network.

The devices 105 (e.g., using the first network 205 of the machine learning network 200) may perform object detection for objects at one or more orientations (e.g., with various roll angles) in a frame (e.g., an image frame, a video frame). For example, the first network 205 may implement aspects of an omni-directional object detection system. In some examples, the device 105 may perform object detection from one or more angular positions of a frame (e.g., an image frame, a video frame). As such, the first network 205 may have one or more detection branches that may be enable the devices 105 to perform object detection from one or more angular positions of a frame (e.g., an image frame, a video frame). In some examples, the first network 205 may have four (4) detection branches and each detection branch may be associated with object detection from a different angular position of a frame (e.g., an image frame, a video frame). For example, based on the first network 205 having four detection branches, the devices 105 may perform object detection from four different angular positions of the frame (e.g., an image frame, a video frame).

In some examples, each of the detection branches of the first network 205 may be associated with a network (e.g., a sub-network of the first network 205). In some examples, the detection branches may include a combination of convolutional and pooling layers of the first network 205. In some examples, the detection branches may include combinations of convolutional and pooling layers. For example, a subset of convolutional and pooling layers included in the first network 205 associated with a first detection branch may include a subset of convolutional and pooling layers included in the first network 205 associated with a second detection branch, or for example, a different subset of convolutional and pooling layers. In some examples, based on the one or more detection branches included in the first network 205, the first network 205 may be referred to as a multi-task convolutional neural network.

In the examples where the first network 205 includes four detection branches, the first network 205 may include four networks, and each of the one or more networks may be tasked with performing the frame processing of one detection branch (e.g., based on the combination of convolutional and pooling layers of each of the one or more networks). In some examples, the one or more networks may feature a base network, but may each be associated with different kernel rotations. In such examples, the first network 205 may generate four detection branches by using four different kernel rotations of the base network. As such, the detection branches may each enable the devices 105 to detect objects using a network process (e.g., a combination of convolutional and pooling layers), but each detection branch may enable the devices 105 to perform object detection from an angular position of a frame (e.g., an image frame) based on kernel rotation. In some examples, the base network may refer to the combination or permutation of convolutional and pooling layers of the one or more networks. In some examples, the kernel rotation may refer to the angular position associated with each of the one or more detection branches.

In some examples, the first network 205 may employ four detection branches, and each detection branch may enable the devices 105 to perform object detection based on a different angular position of a frame (e.g., an image frame, a video frame). In such examples, the devices 105 (e.g., via the four detection branches of the first network 205) may detect candidate objects 240-*a* through 240-*d*. In some examples, a first detection branch may support the detection of the candidate object 240-*a* (e.g., an up-right candidate object 240) based on a first angular position (e.g., up-right, where up-right is equal to 0° relative to an initial orientation of the image), while the other three detection branches may support the detection of candidate objects based on angular positions different than the first angular position. For example, the devices 105 (e.g., via the other three detection branches) may detect candidate the objects 240-*b*, 240-*c*, and 240-*d* based on the kernel rotations corresponding to the other three detection branches. In some examples, the devices 105, using a second detection branch, may perform object detection based on an angular position 90° counter-clockwise relative to the angular position associated with the first detection branch. For example, the second detection branch may support the detection of the candidate object 240-*b* based on the network associated with the second detection branch (e.g., based on the network having a kernel rotation of 90°).

In some examples, the devices 105 (e.g., using each detection branch) may detect the candidate objects 240 within an angular range of the angle associated with the object detection performed by the devices 105 (e.g., based on which detection branch the devices 105 are using). For example, each detection branch may support the detection of the candidate objects 240 within a range of angular positions with respect to the angular position of the detection branch (e.g., an angular range of +/−45°). In some examples, the first detection branch may support object detection based on a first angular position (e.g., up-right) and the devices 105 (e.g., using the first detection branch) may detect the candidate object 240-*a*. Additionally, the devices 105 (e.g., while still using the first detection branch) may also detect the candidate objects 240 within a range of angular positions with respect to the first angular position (e.g., within an angular range of +/−45° with respect to the up-right position).

For each detection branch, the devices 105 (e.g., using the first network 205) may merge the candidate objects 240 (e.g., using non-max suppression (NMS)). For example, using the first network 205, the devices 105 may combine the candidate objects 240 having an orientation within a threshold of the orientation of the candidate object 240-*b* having the same orientation as the candidate object 240-*b*, or having an orientation within a threshold angular range of the orientation of the candidate object 240-*b*), which may reduce the number of the candidate objects 240. For example, the devices 105 may detect the candidate object 240-*b* based on using the second detection branch and may also detect candidate objects 240 that may be repeats of the candidate object 240-*b*. As such, the devices 105 may merge candidate objects 240 having an orientation within a threshold of the orientation of the candidate objects 240-*a*, 240-*c*, or 240-*d* (e.g., the devices 105 may merge the candidate objects 240 with orientations within a threshold angular range of one another). Based on merging the candidate objects 240 based on orientation (e.g., based on candidate objects 240 having orientations within a threshold of one another), the devices 105 may reduce the number of repeats that may be detected using each detection branch. In some examples, the devices 105 may determine that the candidate objects 240 orientations within a threshold of one another if an angular offset between the candidate objects 240 is less than a threshold angle.

After object detection and merging, the devices 105 (e.g., using the first network 205) may rotate the candidate objects 240 based on the detection branches associated with detecting the candidate objects 240. For example, the devices 105 may rotate the candidate object 240-*b*, detected by the second detection branch, 90° clockwise such that the orientation of the candidate object 240-*b* within a threshold of the orientation of the candidate object 240-*a* (e.g., such that the candidate object 240-*b* is up-right within a threshold range or within a threshold angle of the initial orientation of the image). In this manner, the one or more candidate objects 240 detected by the devices 105 (e.g., using the first network 205) may be output to the second network with orientations within a threshold of one another. The first stage may output object recognition information based on the candidate object 240. In some examples, the object recognition information may include the candidate objects 240 and the bounding box locations 225 of the candidate objects 240. In some examples, the devices 105 may determine a classification score 220 based on the object recognition information.

The second stage may be a refinement stage and may be associated with a second network 210. In some examples, the second network 210 may be a refinement network (R-Net). For example, the devices 105 (e.g., using the second network 210) may detect objects in an input frame region (e.g., the candidate objects 240 input from the first stage). At the second stage, in some examples, the devices 105 may refine the results of the candidate object 240 input from the first stage. The second network 210 may include one or more branches corresponding to one or more outputs. In some examples, the second network 210 may include four branches and four outputs (e.g., four branches of output layers), where the four outputs may respectively correspond to the four branches. As such, the devices 105 (e.g., using the second network 210) may output four layers from the second stage.

In some examples, the devices 105 may output a classification score 220-*b*, a bounding box location 225-*b*, a number of object landmarks 230-*a*, and an up-right determination 235-*a*. For example, the devices 105, using the second network 210, may regress (e.g., refine) the confidence score of the candidate objects 240 (e.g., the candidate object region) and the bounding box locations 225-*b*, detect the object landmarks 230-*a*, and determine if the candidate objects 240 are up-right. In some examples, at the second stage, the devices 105 may regress the confidence score of the candidate object 240 and the bounding box locations 225-*b* to improve the accuracy of the results output by the devices 105 at the first stage. In some examples, at the second stage using the second network 210), the devices 105 may determine the confidence score of the candidate objects 240 based on the detected candidate objects 240 and the bounding box locations 225 associated with the candidate objects 240. The devices 105, using the second network 210, may merge the candidate objects 240 based on one or more example aspects in which the devices 105 merged the candidate objects 240 using the first network 205 (e.g., using NMS). For example, using the second network 210, the devices 105 may merge the candidate objects that were detected by the same detection branch.

In some examples, the devices 105 (e.g., using the second network 210) may determine that a candidate object 240 is not up-right. For example, after rotation during the first stage, a candidate object 240 output by the first network 205 may not be up-right (e.g., based on a roll angle of the candidate object 240 relative to the angular position associated with the detection branch that detected the candidate object 240). For example, when detecting the candidate objects 240 using a first detection branch (having an associated angular position equal to 0°) of the second network 210, the devices 105 may determine a candidate object 240 as not being up-right based on an orientation of the candidate object 240 relative to the angular position of 0°. In an example, the devices 105 may classify the candidate object 240 as not up-right when a portion (e.g., a top portion) of the candidate object 240 is oriented outside of an angular range of +/−45° relative to the angular position of 0° (e.g., oriented upward at an angle of 46°, oriented upward at an angle of 314°, etc.). In such examples, the devices 105 may use the object landmarks 230-*a* detected by the second network 210 to rotate the candidate object 240 (e.g., such that the candidate object 240 is up-right after the rotation).

The third stage may be associated with a third network 215, where the third network 215 may perform the image processing that occurs during the third stage. The third network 215 may be an output network (O-Net), and in some aspects, the devices 105 (e.g., using the third network 215) may output the result of the object detection system (e.g., the omni-directional object detection system). In some examples, the third network 215 may include a number of branches corresponding to a number of outputs. In some examples, the third network 215 may include four branches and four outputs (e.g., four branches of output layers), where the four outputs may respectively correspond to the four branches. In such examples, the devices 105 (e.g., using the third network 215) may output an object classification score 220-*c*, a bounding box location 225-*c*, a number of object landmarks 230-*b*, and an up-right object determination 235-*b* for each of a number of candidate objects 240. In some examples, the devices 105, using the third network 215, may merge the candidate objects 240 based on one or more example aspects in which the devices 105 merged the candidate object 240 using the first network 205 and the second network 210 (e.g., using NMS). In some examples, the devices 105 may merge candidate objects 240 detected by the same detection branch. In some examples, the devices 105 may determine to rotate each of the candidate objects 240 such that the candidate objects 240 map back to the original image.

Examples of aspects of the object detection system described herein (e.g., the omni-directional object detection system) may include a two-pass object detection system. For example, the object detection system may include the first, second, and third stages of the machine learning network 200 and may be implemented by the devices 105 in one or more passes. For example, based on processing an input a frame (e.g., an image frame, a video frame) using the first network 205, the second network 210, and the third network 215 of the machine learning network 200 during a first pass, the devices 105 may determine to process a second input frame (e.g., an incoming image) using a second pass of the first network 205, the second network 210, and the third network 215 of the machine learning network 200. In some examples, based on the result of the object detection using the third network 215, the devices 105 may determine whether to process the second input frame. In some alternative examples, the second input frame may be the same input frame processed during the first pass.

In such two-pass object detection systems, a first pass may include performing object detection from a first set of one or more angular positions and a second pass may include performing object detection from a second set of one or more angular positions. As described herein, the first network 205 may be a multi-stage convolutional neural network and may initially detect objects from one or more angular positions. In some examples, the first network 205 may perform object detection based on a first set of one or more angular positions during the first pass and may perform object detection based on a second set of one or more angular positions during the second pass. In some examples, the one or more angular positions used in the second pass may be based on an offset (e.g., a difference in angle rotation) with respect to the one or more angular positions used in the first pass.

An offset or (e.g., an adjustment) of 45° may be used during the second pass. For example, the devices 105 may rotate (e.g., adjust) the second frame (e.g., rotate an image by 45°), and in some aspects, process the rotated frame using the second pass. In an example, the one or more angular positions of the second pass may be offset (e.g., rotated) by 45° from the one or more angular positions of the first pass. In some examples, the first network 205 may have four (4) detection branches, and the devices 105 may perform object detection (e.g., using the first network 205) based on angular positions of 0°, 90°, 180°, and 270° during the first pass. In some examples, the devices 105 may perform (e.g., using the first network 205) object detection at angular positions of 45°, 135°, 225°, and 315° during the second pass, based on the rotation of the frame (e.g., image) according to the offset.

In some examples, using multi-pass (e.g., two-pass) object detection, the omni-directional object detection system may minimize or eliminate potential blind spots (e.g., boundary cases which may arise due to training around boundary conditions). In some examples, boundary cases may arise for each detection branch at, or near, the edges of the range of angles associated with object detection for the detection branch. For example, each detection branch of the first network 205 may each have a detection range of +/−45° with respect to the angular position of the detection branch. In some examples, respective angular positions of four detection branches of the first network 205 may be 0°, 90°, 180°, and 270°, and boundary cases may arise for candidate objects 240 with roll angles near 45°, 135°, 225°, and 315° relative to up-right (e.g., where up-right is equal to 0° or within a threshold angle of an initial orientation of an image). In some examples, in performing a second pass of the first network 205 based on rotating the frame by 45°, the devices 105 may detect the boundary cases of the first pass. For example, using the second pass of the first network 205, the devices 105 may perform object detection at angular positions of 45°, 135°, 225°, and 315° (e.g., at the boundary cases of the first pass).

By performing a second pass of the first network 205 with an offset equal to or within a threshold of half of the angular range of the one or more detection branches, the machine learning network 200 may enable more accurate object detection for objects with roll angles near the boundaries of the first pass of the first network 205. Such two-pass object detection may enhance object detection accuracy and efficiency in video-based applications, where the difference between each frame may be minimal. In some examples, because of the small difference between each frame, execution time and processor usage may be reduced. Further, the two-pass object detection system described herein may perform object detection from any orientation of a frame (e.g., an image frame, a video frame) from all 360° of the frame.

Figure 3:
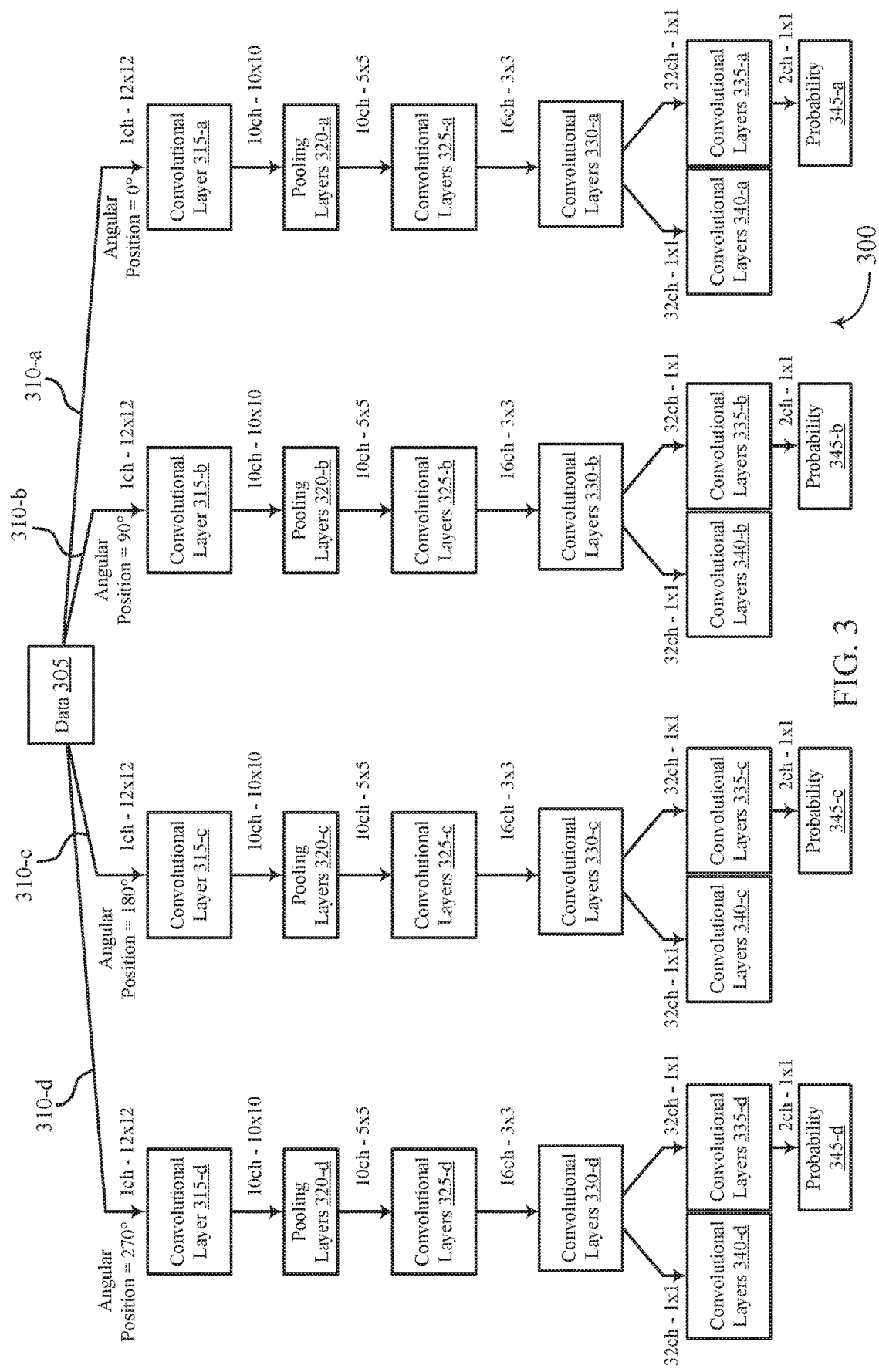
FIG. 3 illustrates an example of a proposal network that supports a two-pass omni-directional object detection in accordance with aspects of the present disclosure.

FIG. 3 illustrates an example of a proposal network 300 that supports a two-pass omni-directional object detection in accordance with aspects of the present disclosure. In some examples, the proposal network 300 may implement aspects of the multimedia system 100 and the machine learning network 200 as described in FIGS. 1 and 2. For example, the proposal network 300 may be an example of the first network 205 as described in FIG.

With reference to FIGS. 1 and 3, the devices 105, using the proposal network 300, may implement aspects of an omni-directional object detection system. For example, the devices 105 (e.g., using the proposal network 300) may perform object detection based on one or more angular rotations of an image. In some examples, the proposal network 300 may be a multi-stage convolutional neural network (e.g., may perform multiple image processing tasks). The proposal network 300 may include one or more detection branches 310 and the devices 105 may be capable of detecting objects using the one or more detection branches 310. The proposal network 300 may include one or more networks that may perform frame (e.g., an image frame, a video frame) processing for the one or more detection branches 310. In some examples, the networks of the detection branches 310 may include combinations of convolutional and pooling layers. For example, a subset of convolutional and pooling layers included in the proposal network 300 associated with a first detection branch 310 may include a subset of convolutional and pooling layers included in the proposal network 300 associated with a second detection branch 310, or for example, a different subset of convolutional and pooling layers.

The proposal network 300 may include four detection branches 310. In some examples, the detection branches 310 may each utilize or include a network for performing the frame processing for each detection branch 310. In some examples, the detection branches 310 may utilize or include the same network or a portion of the same network for performing the frame processing. For example, the detection branches 310 may feature the same base network but may be associated with different kernel rotations. In such examples, for example, the detection branches 310 may respectively be associated with different kernel rotations of the base network. In some examples, the devices 105 (e.g., using each of the one or more detection branches 310) may detect objects using a network (e.g., a combination of convolutional and pooling layers, for example, the same combination of convolutional and pooling layers, or different combinations of convolutional and pooling layers), but the devices 105 may perform object detection from an angular position of the frame (e.g., an image) based on the detection branch 310 (e.g., based on the kernel rotation of the network of the detection branch 310).

In some examples, the proposal network 300 may employ four networks based on using four different rotations of the kernel of the base network. Each of the four networks may correspond to a detection branch 310 based on the rotation of the kernel of each network. In some examples, a detection branch 310-a may be associated with a network with a 0° kernel rotation (e.g., the detection branch 310-a may be associated to the base network). The devices 105 may use the detection branch 310-a to detect objects based on an angular position of 0° (e.g., the initial orientation of the image or up-right). In some examples, a detection branch 310-b may be associated with a network with a 90° kernel rotation (e.g., relative to the kernel of the base network) such that the devices 105, using the detection branch 310-b, may detect objects in the frame based on an angular position of 90° (e.g., relative to the angular position at which the devices 105 may detect objects using the detection branch 310-a). In some aspects, a detection branch 310-c may be associated with a network with a kernel rotation of 180° (e.g., relative to the kernel of the base network) and the devices 105, using the detection branch 310-c, may detect objects from an angular position of 180° (e.g., relative to the angular position at which the devices 105 may detect objects using the detection branch 310-a). A detection branch 310-d may be associated with a network with a kernel rotation of 270° (e.g., relative to the base network) and the devices 105, using the detection branch 310-d, may detect objects from an angular position of 270°.

In some examples, the devices 105 (e.g., using a detection branch 310) may detect objects within an angular range (e.g., a range of roll angles) of the angle associated with the object detection performed by the devices 105 (e.g., based on detection branch 310). For example, each detection branch 310 may support object detection (e.g., of candidate objects 240) within the range of angular positions with respect to the angular position of the detection branch 310 (e.g., an angular range of 45°). In some examples, the devices 105 may use the detection branch 310-b and may perform object detection based on a 90° angular position of the image. In such examples, the devices 105 may detect objects with an angular position (e.g., with a roll angle measured from vertical) within the range of 45° to 135° (i.e., 90°+/−45°). Additionally, for example, the devices 105 may use the detection branches 310-a, 310-c, and 310-d and may perform object detection for objects with roll angle ranges of 315° to 45°, 135° to 225°, and 225° to 315°, relative to up-right, respectively. In this manner, the devices 105 (e.g., using proposal network 300) may be capable of detecting objects with any angular position in an image (e.g., from all 360° of an image).

Using the proposal network 300, the devices 105 may receive data 305 (e.g., data associated with an input image) and identify the candidate objects 240 included in data 305 through the detection branches 310. The devices 105 may perform object detection and identify one or more candidate objects 240 by processing the data 305 by using the detection branches 310. As described, by using the detection branches 310, the devices 105 may perform object detection using different angular positions and may perform object detection from each of the different angular positions. For example, each detection branch 310 may include a combination of convolutional layers and pooling layers (e.g., the same combination of convolutional layers and pooling layers, or different combinations of convolutional layers and pooling layers). The devices 105 may output information via each convolutional layer 340 and may output probability 345 of detection branches 310.

For example, at each detection branch 310, the devices 105 may process the data 305 associated with different angles or angular rotations (e.g., 0°, 90°, 180°, and 270°), using a combination of convolutional layers 315, 325 and 330 and pooling layers 320. In an example, at the detection branch 310-a, the devices 105 may process the data 305 (e.g., a subset of data 305 associated with an angle 0°) using a set of convolutional layers 315-aa. In some aspects, the set of convolutional layers 315-a may include one or more convolutional layers for processing one or more channels of an image region. In an example, at the set of convolutional layers 315-a, the devices 105 may process 1 channel of a 12×12 image region and output 10 channels of a 10×10 image region. Using a set of pooling layers 320-a (e.g., one or more pooling layers), the devices 105 may process the 10 channels of the 10×10 image region and output 10 channels of a 5×5 image region. Using a set of convolutional layers 325-a (e.g., one or more convolutional layers), the devices 105 may process 10 channels of the 5×5 image region and output 16 channels of a 3×3 image region. Using a set of convolutional layers 330-a (e.g., one or more convolutional layers), the devices 105 may process the 16 channels of the 3×3 image region and output 32 channels of a 1×1 image region.

In some aspects, using a set of convolutional layers 335-a (e.g., one or more convolutional layers), the devices 105 may process the 32 channels of the 1×1 image region and output 2 channels of a 1×1 image region. The devices 105 may process the 2 channels of the 1×1 image region and, in some aspects, output a probability 345-a associated with a candidate object and the 2 channels of the 1×1 image region. In some additional aspects, using a set of convolutional layers 340-a (e.g., one or more convolutional layers), the devices 105 may process the 32 channels of the 1×1 image region. According to examples of aspects described herein, at the detection branch 310-b, the devices 105 may process the data 305 (e.g., subsets of the data 305 associated with angles 90°) using sets of convolutional layers 315-b, 325-b, 330-b, 335-b, and 340-b and a set of pooling layers 320-b. Alternatively or additionally, at the detection branch 310-c, the devices 105 may process the data 305 (e.g., subsets of the data 305 associated with angles 180° using sets of convolutional layers 315-c, 325-c, 330-c, 335-c, and 340-c and a set of pooling layers 320-c. In some aspects, at the detection branch 310-d, the devices 105 may process the data 305 (e.g., subsets of the data 305 associated with angles 270°) using sets of convolutional layers 315-d, 325-d, 330-d, 335-d, and 340-d and a set of pooling layers 320-d.

Based on the processing of the data 305 using the combination of convolutional layers 315, 325 and 330 and pooling layers 320, the devices 105 may output probabilities 345-a through 345-d. In some aspects, the processing of the data 305 may further include using convolutional layers 340-a through 340-d. The outputs of the proposal network 300 may include information based on one or more of the candidate objects 240 identified in the data 305. In some examples, the outputs may include the classification score 220-a and the bounding box location 225-a as described with reference to FIG. 2.

The input image may include an image of arbitrary size. In some aspects, the devices 105 may resize the input image prior to or during the first stage. For example, the devices 105 may process an image of an arbitrary size using the proposal network 300. In some aspects, in processing the image using the proposal network 3'00, the devices 105 may resize the image and process the resized image region (e.g., resize the image to a 12×12 image region, or resize a frame of a video to a 12×12×1 image region). In some examples, the devices 105 may resize the image based on the same scale. In some aspects, the devices 105 may resize the image based on different scales for multi-resolution object detection. For example, the devices 105 may resize (e.g., reduce in size) any input image regions larger than a threshold image region size, such as 12×12. In some examples, using the proposal network 300, the devices 105 may process an input image having an image region larger than the threshold image region size and output, at each detection branch 310, information (e.g., classification score 220-a and bounding box location 225-a) associated with one or more candidate objects 240 located in a resized image region.

In some examples, the devices 105 may output the bounding box location 225-a in terms of one or more coordinates of the bounding box location 225-a. For example, the devices 105 (e.g., using the proposal network 300) may output the coordinates of the top-left and the bottom-right corners of the bounding box location 225-a. In some examples, the coordinates may be output as displacement values based on a reference point of the image region. For example, the devices 105 may output displacement coordinates (dx1, dy1) and (dx2, dy2) corresponding to the top-left and bottom-right corners of a bounding box location 225-a, respectively. In some examples, the input image may be resized during the course of image processing. In such examples, as an image is resized the displacement values may be normalized based on the size of the image region. In this manner, the bounding box location 225-a may be determined relative to a resized image region and the original image region based on the normalization.

In some examples, the displacement values of the top-left and bottom-right corners of a hounding box location 225-a may be calculated based on a reference point at the top-left corner of the image. In the course of the omni-directional object detection by the devices 105 using the proposal network 300, the detection branches 310 may employ networks with differently rotated kernels to detect objects from one or more angular positions of the image, where each of the networks includes a combination of convolutional and pooling layers (e.g., the same combination of convolutional layers and pooling layers, or different combinations of convolutional layers and pooling layers). In some examples, due to the kernel rotation, the location of the reference point of the image region may be different for each of the detection branches 310. For example, the devices 105, using the detection branches 310, may perform object detection from one or more angular positions of an image region such that the reference point of the image region when using one detection branch 310 (e.g., detection branch 310-b) may be rotated by an angle relative to the reference point of the image region when using a different detection branch 310 (e.g., detection branch 310-a). In such examples, the devices 105 may update the displacement of (dx1, dy1) and (dx2, dy2) for compatibility between the coordinates of the bounding box locations 225-a determined by each detection branch 310. Equations 1 through 4 refer to an example in which four detection branches 310 are used. According to examples of aspects herein, Equations 1 through 4 may include transformations of the displacement coordinates according to the direction dir of each of the angular positions of the detection branches 310. Rotated coordinate displacements with regards to (dx1, dy1) and (dx2, dy2) may be (dx1_4, dy1_y) and (dx2_r, dy2_r) respectively.

$$dx1_r = \begin{cases} dx1, & dir = 0° \\ dx1, & dir = 90° \\ -dx2, & dir = 180° \\ -dx2, & dir = 270° \end{cases} \quad (1)$$

$$dy1_r = \begin{cases} dy1, & dir = 0° \\ -dx2, & dir = 90° \\ -dy2, & dir = 180° \\ dx1, & dir = 270° \end{cases} \quad (2)$$

$$dx2_r = \begin{cases} dx2, & dir = 0° \\ dy2, & dir = 90° \\ -dx1, & dir = 180° \\ -dy1, & dir = 270° \end{cases} \quad (3)$$

$$dy2_r = \begin{cases} dy2, & dir = 0° \\ -dx1, & dir = 90° \\ -dy1, & dir = 180° \\ dx2, & dir = 270° \end{cases} \quad (4)$$

The devices 105 may merge the candidate objects 240 of each detection branch 310 (e.g., using NMS). In some examples, the candidate objects 240 of each detection branch 310 may be merged with NMS separately to reduce the number of candidate objects 240. For example, one method to perform NMS may be to sort the one or more candidate objects 240 based on a classification score 220 of each of the one or more candidate objects 240 and compare a determined parameter (e.g., an intersection over union (IOU)) to a threshold value. In some examples, the devices 105 may identify an IOU of a number of sorted candidate objects 240 and may compare the IOU to the threshold value. In some examples, the devices 105 may determine an IOU by comparing the classification scores 220-a of two or more candidate objects 240. If the IOU of the sorted candidate objects 240 is greater than the threshold value, a candidate object 240 with a smaller confidence may be dropped (e.g., a candidate object 240 associated with the lowest confidence may be dropped).

The devices 105 may rotate a candidate object 240 (e.g., each of the number of candidate objects 240) to an up-right position based on which detection branch 310 the candidate object 240 was detected from. For example, the devices 105 may rotate candidate objects 240 (e.g., candidate objects 240-b) that may have been detected using the detection branch 310-b 90° clockwise such that the candidate objects 240-b may be oriented up-right (e.g., oriented within a threshold of an orientation of candidate objects 240-a that may have been detected by the devices 105 using the detection branch 310-a. Likewise, the devices 105 may rotate candidate objects 240 (e.g., candidate objects 240-c) that may have been detected using detection branch 310-c 180° clockwise, and the devices 105 may rotate candidate objects 240 (e.g., candidate objects 240-d) that may have been detected using detection branch 310-d 270° clockwise. As such, the devices 105 may rotate candidate objects 240 such that the candidate objects 240 are oriented up-right (e.g., based on an initial orientation of the image). The devices 105 may output the up-right candidate objects 240 along with classifications 220 and bounding box locations 225 determined by the device (e.g., using the proposal network 300) of the candidate objects 240.

Figure 4:
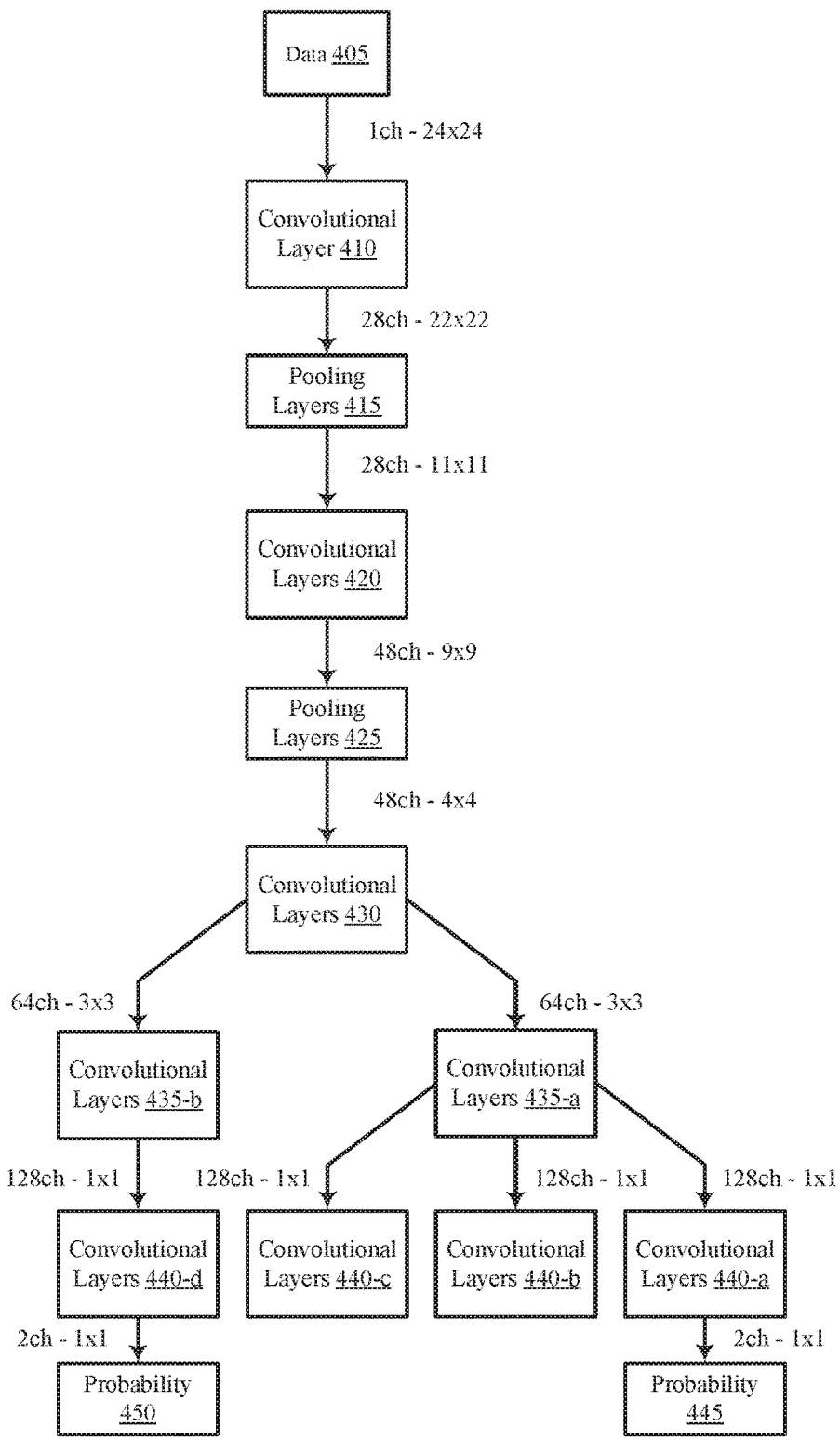
FIG. 4 illustrates an example of a refinement network that supports a two-pass omni-directional object detection in accordance with aspects of the present disclosure.

FIG. 4 illustrates an example of a refinement network 400 that supports a two-pass omni-directional object detection in accordance with aspects of the present disclosure. In some examples, the refinement network 400 may implement aspects of the multimedia system 100 and machine learning network 200. For example, the refinement network 400 may be an example of the second network 210 as described in FIG. 2.

With reference to FIGS. 1 and 4, the devices 105, using the refinement network 400, may implement aspects of an omni-directional object detection system. For example, the devices 105 (e.g., using the refinement network 400) may refine the results output by the devices at the first stage (e.g., using the proposal network 300). In some examples, the refinement network 400 may be associated with one network. For example, the devices 105 may process the candidate objects 240 output from the first stage with the same combination of convolutional and pooling layers based on the candidate objects 240 being up-right (e.g., based on the candidate objects 240 having orientations within a threshold of one another). Based on processing the candidate objects 240 using the refinement network 400, the devices 105 may output object recognition information refined object recognition information) of candidate objects 240. The devices 105, using the refinement network 400, may output information via each convolutional layer 440-*b* and 440-*c* and may output probabilities 445 and 450. In some examples, the outputs of refinement network 400 may correspond to the classification score 220-*b*, the bounding box location 225-*b*, the number of object landmarks 230-*a*, and the up-right determination 235-*a* as described with reference to FIG. 2.

The refinement network 400 may include a combination of convolutional layers and pooling layers. For example, the refinement network 400 may include a set of convolutional layers 410, a set of pooling layers 415, a set of convolutional layers 420, a set of pooling layers 425, a set of convolutional layers 430, sets of convolutional layers 435-*a* and 435-*b*, and sets of convolutional layers 440-*a* through 440-*d*. In some aspects, the devices 105 may process data 405 using a combination of the sets of convolutional layers and pooling layers.

In some aspects, at the set of convolutional layers 410 (e.g., one or more convolutional layers), the devices 105 may process 1 channel of a 12×12 image region and output 28 channels of a 22×22 image region. Using a set of pooling layers 415 (e.g., one or more pooling layers), the devices 105 may process the 28 channels of the 22×22 image region and output 28 channels of an 1×1 image region. Using a set of convolutional layers 420 (e.g., one or more convolutional layers), the devices 105 may process the 28 channels of the 11×11 image region and output 48 channels of a 9×9 image region. The devices 105 may use a set of pooling layers 425 (e.g., one or more pooling layers) to process the 48 channels of the 9×9 image region and output 48 channels of a 4×4 image region. Using a set of convolutional layers 430 (e.g., one or more convolutional layers), the devices 105 may process the 48 channels of the 4×4 image region and output 64 channels of a 3×3 image region.

In some aspects, using a set of convolutional layers 435-*a* (e.g., one or more convolutional layers), the devices 105 may process the 64 channels of the 3×3 image region and output 128 channels of a 1×1 image region. In some aspects, the devices 105 may use a set of convolutional layers 440-*a* (e.g., one or more convolutional layers) to process the 128 channels of the 1×1 image region and output 2 channels of a 1×1 image region. In some examples, the devices 105 may process the 2 channels of the 1×1 image region and, in some aspects, output a probability 445 associated with a candidate object and the 2 channels of the 1×1 image region. In some additional aspects, the devices 105 may use a set of convolutional layers 440-*b* (e.g., one or more convolutional layers) and/or a set of convolutional layers 440-*c* (e.g., one or more convolutional layers) to process the 128 channels of the 1×1 image region.

Additionally or alternatively to processing the 64 channels of the 3×3 image region using the set of convolutional layers 435-*a*, the devices 105 may process the 64 channels of the 3×3 image region using a set of convolutional layers 435-*b* (e.g., one or more convolutional layers) and output 128 channels of a 1×1 image region. Using a set convolutional layers 440-*d*, the devices 105 may process the 128 channels of the 1×1 image region and output 2 channels of a 1×1 image region. The devices 105 may process the 2 channels of the 1×1 image region and, in some aspects, output a probability 450 associated with a candidate object and the 2 channels of the 1×1 image region.

Based on the processing of the data 405 using the combination of convolutional layers 410, 420, 430, 435, 440-*a*, and 440-*d* and the pooling layers 415 and 425, the devices 105 may output the probabilities 445 and 450. In some aspects, the processing of data 405 may further include using the convolutional layers 440-*b* and 440-*c*. The outputs of the refinement network 400 may include information based on one or more candidate objects 240 identified in the data 405. In some examples, the data 405 may be information based on one or more candidate objects 240 and the outputs of the refinement network 400 may include object recognition information (e.g., refined object recognition information) based on the one or more candidate objects 240. In some examples, the outputs may include the classification score 220-*b*, the bounding box location 225-*b*, a number of landmarks 230-*a*, and an up-right determination 235-*a* as described with reference to FIG. 2.

In some examples, the image region processed by the refinement network 400 may be a different size than the image region processed by the proposal network 300. For example, the input image at the second stage may be a 24×24 image region or, in the case of a video application, a 24×24×1 image region. For example, the refinement network 400 may resize the image region to 24×24 (e.g., 24×24×1 in the case of frames of video).

In some examples, the devices 105 (e.g., using the refinement network 400) may group the candidate objects 240 based on the detection branch 310 the candidate objects 240 are associated with. For example, the devices 105 may group the candidate objects 240 that the devices 105 may have detected using a detection branch 310. The devices 105 may merge the candidate objects 240 (e.g., with NMS) within each group. For example, using the refinement network 400, the devices 105 may group the one or more candidate objects 240 detected by the devices 105 using a first detection branch 310 and merge the candidate objects 240 together with NMS. Likewise, the devices 105 may group and merge (e.g., using NMS) candidate objects 240 detected by the devices 105 using a second detection branch 310.

In some examples, the devices 105 may rotate the candidate objects 240 using the proposal network 300, where the candidate objects may be rotated based on the detection branch 310 that the devices 105 used to detect the candidate objects 240. In some examples, the candidate objects 240 may still have a rotational offset from the up-right orientation of the image. For example, after rotation during the first stage, a candidate object 240 output by the first network 205 may not be up-right (e.g., based on a roll angle of the candidate object 240 relative to the angular position associated with the detection branch that detected the candidate object 240). For example, when detecting candidate objects

240 using a first detection branch (having an associated angular position equal to 0°) of the refinement network 400, the devices 105 may determine a candidate object 240 as not being up-right based on an orientation of the candidate object 240 relative to the angular position of 0°. In an example, the devices 105 may classify the candidate object 240 as not up-right when a portion (e.g., a top portion) of the candidate object 240 is oriented outside of an angular range of +/−45° relative to the angular position of 0° (e.g., oriented upward at an angle of 46°, oriented upward at an angle of 314°, etc.).

In such examples, the devices 105 (e.g., using the refinement network 400) may determine whether the one or more candidate objects 240 are up-right and, if not, rotate the one or more candidate objects 240. For example, the devices 105 may detect one or more object landmarks 230-*a* of a candidate object 240 and may determine a candidate object 240 is not up-right based on the detected object landmarks 230-*a*. To ensure each of the one or more candidate objects 240 are up-right, the devices 105, using the refinement network 400, may use the identified object landmarks 230-*a* of each candidate object 240 to rotate the candidate object 240 so that it is up-right.

For example, in an implementation of the present disclosure in facial recognition, object landmarks may include one or more facial features (e.g., two eyes, a nose tip, two outer mouth corners, etc.). In this implementation, the devices 105 (e.g., using the refinement network 400) may use two detected eyes to determine if a face candidate is up-right. If a detected face is not up-right (e.g., if an angle between the eyes with respect to the horizontal is not 0°), the devices 105 may rotate the face candidate by an angle equal to the angle between the two eyes with respect to the horizontal. For example, if the coordinates of the two eyes (or any object features may be horizontal with respect to one another when the object is up-right) are (x1, y1) and (x2, y2), then an angle θ for a clockwise rotation of the face candidate may be calculated using Equation 5.

$$\theta = \begin{cases} dir - \operatorname{atan}\left(\dfrac{y2 - y1}{x2 - x1}\right), & \text{if } dir \in \{0°, 180°\} \\ dir + \operatorname{atan}\left(\dfrac{x2 - x1}{y2 - y1}\right), & \text{if } dir \in \{90°, 270°\} \end{cases} \quad (5)$$

In some examples, the angle θ may be used to rotate the image region including the candidate object 240. The devices 105 may determine the rotation of the image region based on the angle θ and the dimensions of the image region. For example, an image region (e.g., an image region defined by w0×h0) including a candidate object 240 may be identified for clockwise rotation by angle θ (e.g., if the devices 105, using the refinement network 400, determines the image region is not up-right). In some examples, the devices 105 may crop the image region to a region size of w1×h1, which may be calculated according to Equations 6 and 7.

$$w1 = w0*|\cos(\theta)| + h0*|\sin(\theta)| \quad (6)$$

$$h1 = w0*|\sin(\theta)| + h0*|\cos(\theta)| \quad (7)$$

In some examples, w1 and h1 may be greater than w0 and h0. After the image cropping has been completed, the devices 105 may rotate the cropped image region around its center by the angle θ clockwise. In some examples, devices 105 may rotate the image region by the angle θ using affine projection. The resulting image region may include an up-right candidate object 240. In some examples, the up-right candidate object 240 may be fed to the third stage.

Figure 5:
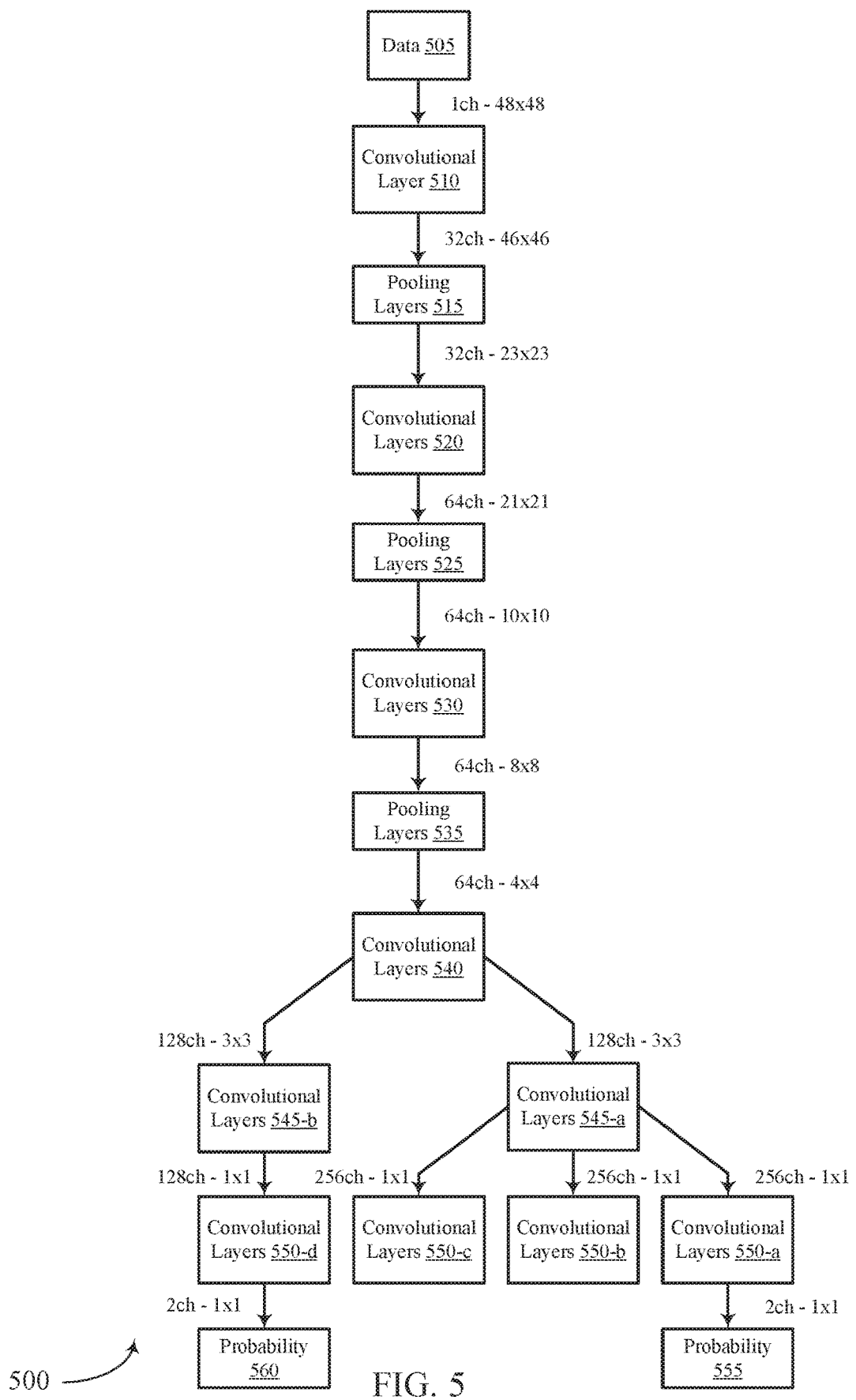
FIG. 5 illustrates an example of an output network that supports a two-pass omni-directional object detection in accordance with aspects of the present disclosure.

FIG. 5 illustrates an example of an output network 500 that supports a two-pass omni-directional object detection in accordance with aspects of the present disclosure. In some examples, output network 500 may implement aspects of the multimedia system 100 and the machine learning network 200. For example, the output network 500 may be an example of the third network 215 as described in FIG. 2.

With reference to FIGS. 1 and 5, the devices 105, using the output network 500, may implement aspects of an omni-directional object detection system. For example, the devices 105 (e.g., using output network 500) may output the result of an omni-directional object detection system (e.g., the machine learning network 200). In some examples, the output network 500 may include a number of branches corresponding to a number of outputs. In some examples, the output network 500 may include four branches (e.g., four branches of output layers). In such examples, the devices 105, using the output network 500, may output an object classification score 220-*c* (e.g., a confidence score), a bounding box location 225-*c*, a number of object landmarks 230-*b*, and an up-right object determination 235-*b* for each of a number of candidate objects 240.

In some examples, the devices 105 (e.g., using output network 500) may process data 505 through a combination of convolutional layers 510, 520, 530, 540, 545, and 550 and pooling layers 515, 525, and 535. In an example, the devices 105 may process data 505 using a set of convolutional layers 510. In some aspects, the set of convolutional layers 510 may include one or more convolutional layers for processing one or more channels of an image region. For example, at the set of convolutional layers 510, the devices 105 may process 1 channel of a 48×48 image region and output 32 channels of a 46×46 image region. Using a set of pooling layers 515 (e.g., one or more pooling layers), the devices 105 may process the 32 channels of the 46×46 image region and output 32 channels of a 23×23 image region. The devices 105, using a set of convolutional layers 520 (e.g., one or more convolutional layers), may process the 32 channels of the 23×23 image region and output 64 channels of a 21×21 image region.

Using a set of pooling layers 525 (e.g., one or more pooling layers), the devices 105 may process the 64 channels of the 21×21 image region and output 64 channels of a 10×10 image region. Using a set of convolutional layers 530 (e.g., one or more convolutional layers), the devices 105 may process the 64 channels of the 10×10 image region and output 64 channels of an 8×8 image region. The devices 105, using a set of pooling layers 535 (e.g., one or more pooling layers), may process the 64 channels of the 8×8 image region and output 64 channels of a 4×4 image region. Using a set of convolutional layers 540 (e.g., one or more convolutional layers), the devices 105 may process the 64 channels of the 4×4 image region and output 128 channels of a 3×3 image region.

In some aspects, using a set of convolutional layers 545-*a* (e.g., one or more convolutional layers), the devices 105 may process the 128 channels of the 3×3 image region and output 256 channels of a 1×1 image region. In some aspects, the devices 105 may use a set of convolutional layers 550-*a* (e.g., one or more convolutional layers) and process the 256 channels of the 1×1 image region and output 2 channels of a 1×1 image region. In some examples, the devices 105 may process the 2 channels of the 1×1 image region and, in some aspects, output a probability 555 associated with a candidate object and the 2 channels of the 1×1 image region. In some additional aspects, the devices 105 may use a set of convolutional layers 550-b (e.g., one or more convolutional layers) and/or a set of convolutional layers 550-c (e.g., one or more convolutional layers) to process the 256 channels of the 1×1 image region.

Additionally or alternatively to processing the 128 channels of the 3×3 image region using the set of convolutional layers 545-a, the devices 105 may process the 128 channels of the 3×3 image region using a set of convolutional layers 545-b (e.g., one or more convolutional layers) and output 128 channels of a 1×1 image region. Using a set of convolutional layers 550-d (e.g., one or more convolutional layers), the devices 105 may process the 128 channels of the 1×1 image region and output 2 channels of a 1×1 image region. The devices 105 may process the 2 channels of the 1×1 image region and, in some aspects, may output a probability 560 associated with a candidate object and the 2 channels of the 1×1 image region.

In some examples, the devices 105, using the output network 500, may process the input image region by merging the number of candidate objects 240 based on the detection branch 310 the devices 105 may have used to detect the candidate objects 240 (e.g., within the detection branch groups as determined by the devices 105 at the second stage). In some examples, the devices 105 may merge a group of candidate objects 240 by performing NMS on a group of candidate objects 240 detected by one detection branch 310. In some examples, after merging candidate objects 240 within each detection branch group, the devices 105 (e.g., using the output network 500) may merge (e.g., may perform a final NMS) for all of the predicted bounding boxes.

In some examples, due to previous rotations of the image regions, the output network 500 may include processing for adjusting the rotated image regions according to the original orientations thereof in the original input image. For example, the devices 105 may adjust the orientation of an image region counterclockwise by an angle θ such the orientation of the image region maps to (e.g., is the same as) the orientation of the image region in the original image. In some aspects, adjusting the orientation of the image regions may include rotating the candidate objects 240 included in the image regions, for example, such that orientations of the candidate objects 240 map to the original orientations thereof in the original input image. For example, the devices 105 may adjust the orientation of the bounding box locations 225-c of a candidate object 240 based on the orientation of the candidate object 240 in the image.

In some examples, rotation of the bounding boxes (indicated by a bold line around candidate objects 240 in FIG. 2) of the candidate objects 240 may be inadequate (e.g., adjustment or modification of the bounding box locations 225-c may be limited). For example, the devices 105 may exclude rotation of bounding boxes from an object detection operation based on an orientation of the bounding box and based on the object detection operation (e.g., the devices 105 may exclude rotation of bounding boxes based on a vertical orientation setting associated with the object detection operation). In some examples, the devices 105 may generate a shape within a bounding box based on the bounding box (e.g., coordinates associated with the bounding box location 225-c) and a candidate object 240 associated with the bounding box. In an example where object detection includes facial recognition, the devices 105 may generate a shape (e.g., ellipse) corresponding to a facial shape. In some aspects, the devices 105 may rotate the shape (e.g., the image region within the shape), while maintaining the orientation and position of the remainder of the bounding box (e.g., the remainder of the bounding box location 225-c remains unchanged). For example, the devices 105 may generate an ellipse within a bounding box (e.g., at a bounding box location 225-c) and rotate the ellipse by an angle θ in a counterclockwise direction.

Alternatively, in some examples, the devices 105 may identify a second bounding box location 225-c based on the rotated ellipse, and the devices 105 may extract and map back to the original image. For example, by rotating a shape within the original bounding box location 225-c of a candidate object 240, the devices 105 may obtain a second bounding box location 225-c with a location (e.g., determined coordinates) in the original image.

In some examples, the devices 105 (e.g., using the output network 500) may determine to perform a second pass. For example, based on the classification score 220-c, the devices 105 may determine the result of the object detection system (e.g., of machine learning network 200) and compare the result to a threshold using the output network 500. Based on the comparison to the threshold, the devices 105 may determine whether to perform a second pass of the machine learning network 200. For example, the output network 500 may include two-pass logic 600, as described in FIG. 6, and the devices 105 may use the two-pass logic 600 to determine whether to perform a second pass.

Figure 6:
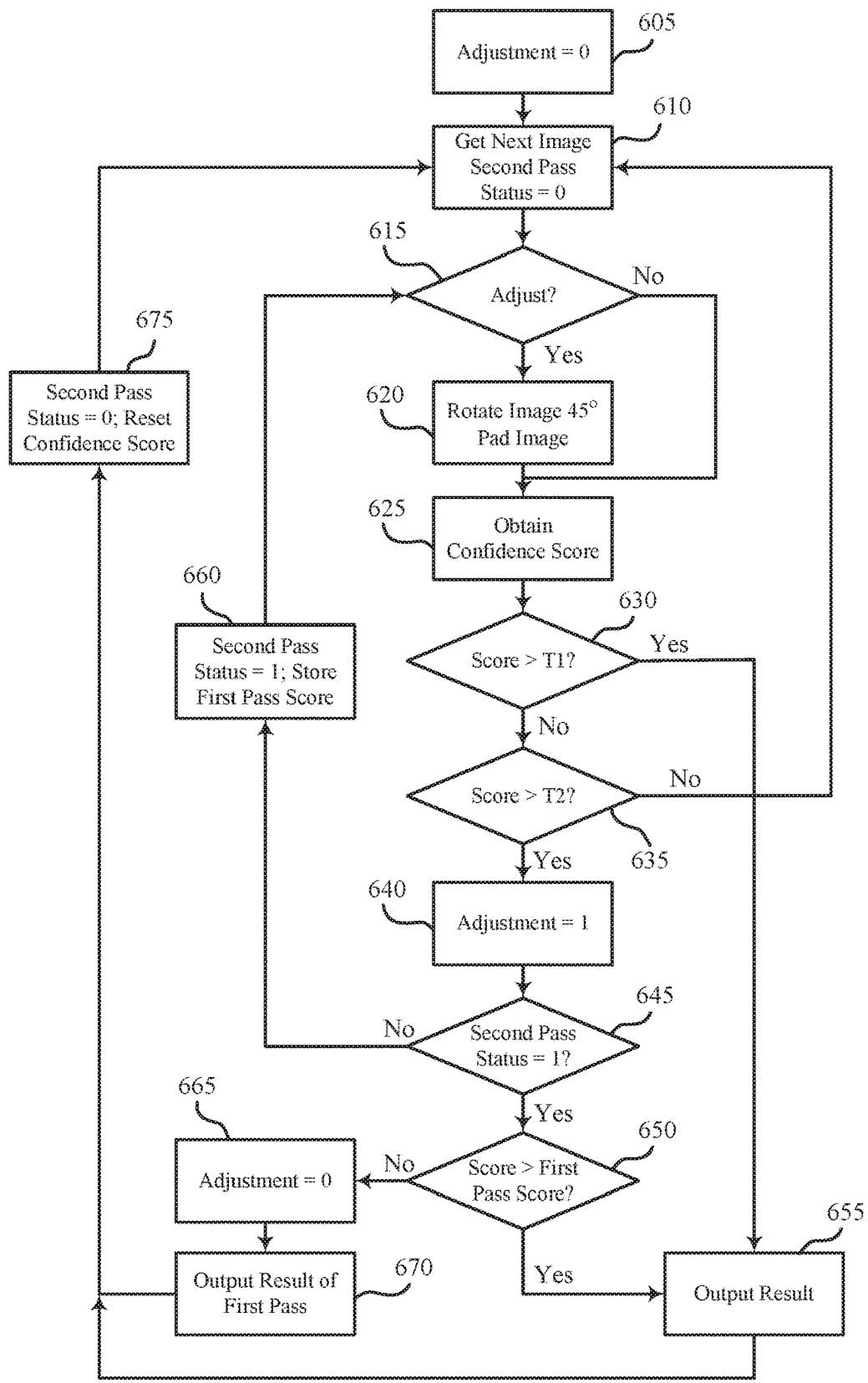
FIG. 6 illustrates an example of two-pass logic that supports a two-pass omni-directional object detection in accordance with aspects of the present disclosure

FIG. 6 illustrates an example of two-pass logic 600 that supports a two-pass omni-directional object detection in accordance with aspects of the present disclosure. In some examples, the two-pass logic 600 may implement aspects of the multimedia system 100 and the machine learning network 200, as described in FIGS. 1 and 2. In some examples, the two-pass logic 600 may be employed to determine whether a second pass may be performed. For example, based on the detection result generated and output using the output network 500, a device 105 may determine, using the two-pass logic 600, whether to perform a second pass based in part on the detection result (e.g., a confidence score). In some examples, the device 105 may determine a confidence score during the first pass, and using the two-pass logic 600, may compare the confidence score to a threshold.

At 605, the device 105 may set (e.g., initialize) an adjustment for an image to be processed (e.g., a next image). In some examples, the adjustment parameter may be set to 0 (e.g., the device 105 may use the two-pass logic to initialize the adjustment parameter to 0, which may correspond to an OFF state). In some examples, the adjustment parameter may be based on whether the device 105 is performing a first pass or a second pass. In some examples, the adjustment parameter may be a flag status.

At 610, the device 105 may identify a next image and may process the image according to the techniques described herein. Based on identifying a next image, the device 105 may use the two-pass logic to determine that the image processing of the image corresponds to a first pass of processing the image. As such, the device 105 may set the second pass status to 0 (e.g., to indicate a first pass).

At 615, the device 105 may identify the state of the adjustment parameter (e.g., on or off). In some examples (e.g., during a first pass), the adjustment parameter may be set to off and the device 105, using the two-pass logic 600, may proceed to step 625 and obtain the confidence score based on the object detection of the image (e.g., based on the results of the machine learning network 200 as described with reference to FIG. 2). At 625, in some examples, the device 105 may determine (e.g., using the second network 210 at the second stage of machine learning network 200)

the confidence score based on the candidate objects 240 and/or the bounding box locations 225 of the candidate objects 240.

At 630, the device 105 may compare the confidence score to a first threshold (T1). In some examples, the device 105 may determine that the confidence score exceeds the first threshold (e.g., that the confidence score determined using the machine learning network 200 exceeds the threshold). In some examples, based on the confidence score exceeding the first threshold, the device 105 may determine that there were no borderline cases (e.g., no boundary cases). In such examples, the device 105 (e.g., using the two-pass logic 600) may determine not to perform a second pass, and the device 105 may output the result (e.g., the object recognition information) of the object detection at 655.

Alternatively, at 630, the device 105 may determine the confidence score is less than the first threshold. In some examples, based on determining the confidence score is less than the first threshold, the device 105 may compare the confidence score to a second threshold (T2) at 635, where 1>T1>T2>0. In some examples, at 635, the device 105 may determine that the confidence score is less than the second threshold. In such examples, the device 105 may not output the confidence score and may determine not to perform a second pass. For example, the device 105, using the two-pass logic 600, may determine that no potential objects (e.g., no candidate objects 240 with an associated confidence score above a threshold) are present in the image and the system may input a new image (e.g., a subsequent frame) at 610.

Alternatively, at 635, the device 105 may determine the confidence score exceeds the second threshold. Based on identifying a confidence score that is less than the first threshold, but greater than the second threshold, the device 105 (e.g., using the two-pass logic 600) may determine that there may be one or more likely candidate objects 240 in the image and the device 105 may have detected one or more borderline cases (e.g., boundary cases) during the first pass. In such examples, the device 105, using the two-pass logic 600, may set the adjustment parameter to an ON state at 640. In some examples, by setting the adjustment parameter to an ON state, the device 105 may adjust the orientation of the candidate bounding box locations associated with a candidate object in the image or adjust the orientation of the candidate object in the image. In some examples, based on determining the confidence score obtained at 625 satisfies the second threshold at 635, the device 105 may authenticate the object recognition information (e.g., based on determining there may be one or more likely candidate objects 240 in the image).

At 645, the device 105 may determine if a second pass has already been performed. For example, the device 105 may identify the state of the second pass status. In some examples, the device 105 may determine that a second pass has not been performed for the image. As such, at 660, the device 105 (e.g., using the two-pass logic 600) may determine to perform a second pass. For example, the device 105 may set the second pass status to 1 (e.g., indicating a second pass) and may store the confidence score determined during the first pass. At 615, the device 105 may identify the state of the adjustment parameter. In some examples, the device 105 may identify that the adjustment parameter is set to an ON state. Based on identifying the adjustment parameter is set to an ON state, the device 105, using the two-pass logic 600, may rotate the image based on an angular offset (e.g., 45°) at 620. In some examples, the device 105 may additionally pad (e.g., resize) the image region to a 224×224 image region at 620.

Based on determining to perform a second pass, the device 105 may perform object detection using the first network 205 (proposal network 300), the second network 210 (refinement network 400), and the third network 215 (output network 500) of machine learning network 200 for a second time with the image. In some examples, the device 105 may perform the second pass with an incoming (e.g., a next or subsequent) image or frame.

At 625, in some examples, the device 105 may determine a confidence score during the second pass. In some examples, the device 105 may perform logic steps 630, 635, and 640 during the second pass, according to aspects as described for performing logic steps 630, 635, and 640 during the first pass. At 645, the device 105 may identify the second pass status. In some examples (e.g., based on performing a second pass), the device 105 may identify that the second pass status is set to 1 (e.g., indicating a second pass). In such examples, the device 105 may compare the confidence score obtained during the first pass and the confidence score obtained during the second pass. For example, the device 105 may determine, at 650, if the confidence score obtained during the second pass (e.g., at 625 when the second pass status is set to 1) is greater than the confidence score obtained during the first pass.

In some examples, the device 105 may output a representation of the confidence score obtained during the first pass or the confidence score obtained during the second pass based on the comparison. For example, the device 105 may identify that the confidence score obtained during the second pass is greater than the confidence score obtained during the first pass. As such, at 655, the device 105 may output the result (e.g., a representation of the object recognition information) of the second pass, reset the confidence scores obtained during the first pass and the second pass at 675, and select or obtain a next image for image processing at 610.

In other examples, the device 105 may identify at 650 that the confidence score obtained during the second pass is less than the confidence score obtained during the first pass. As such, the device 105 may set the adjustment parameter to an OFF state (e.g., such that a next image is not rotated by the angular offset) at 665, may output the result of the first pass at 670, may reset the confidence scores obtained during the first pass and the second pass at 675, and may get a next image for image processing at 610.

Figure 7:
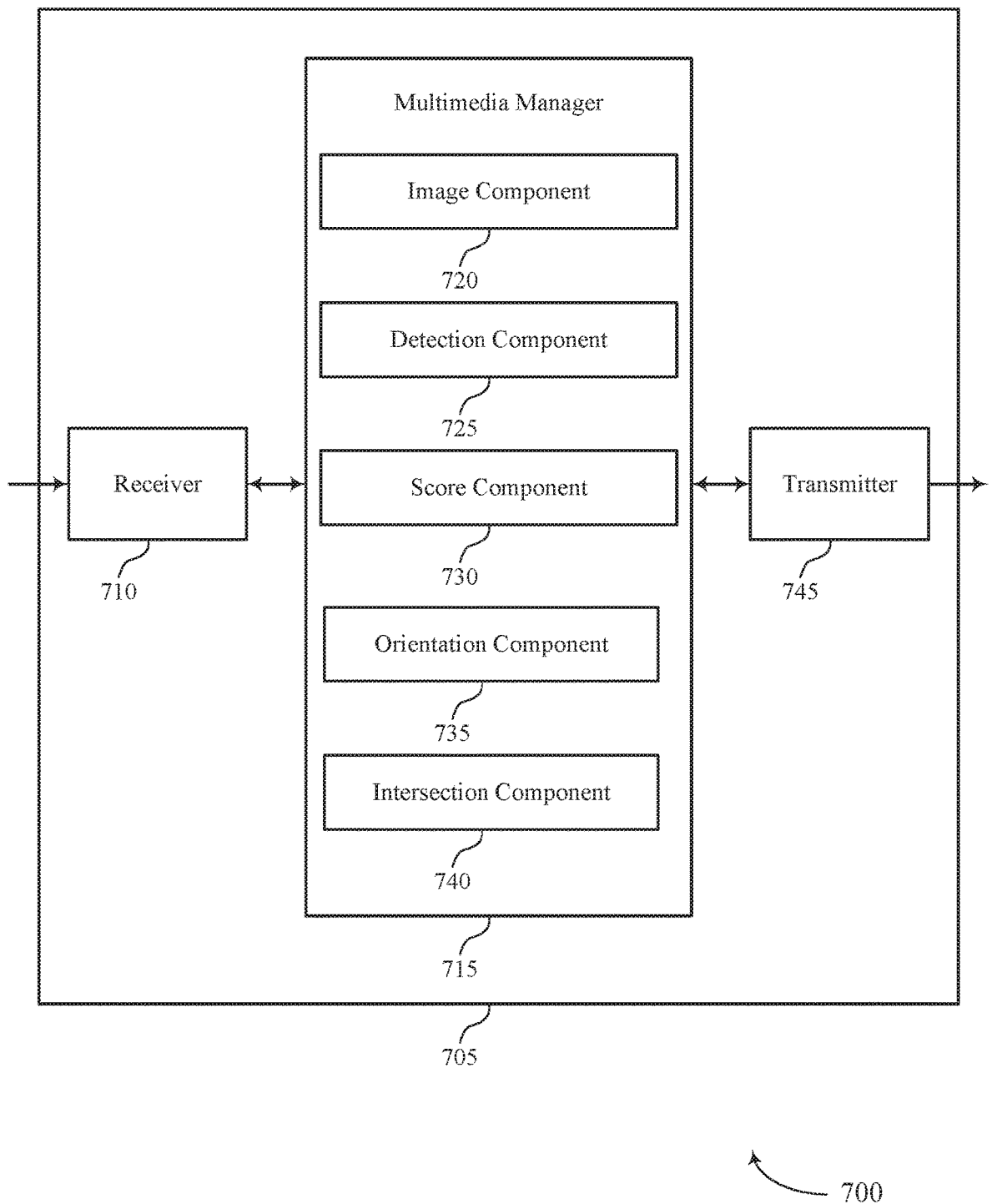
FIG. 7 shows a block diagram of a device that supports a two-pass omni-directional object detection in accordance with aspects of the present disclosure.

FIG. 7 shows a block diagram 700 of a device 705 that supports a two-pass omni-directional object detection in accordance with aspects of the present disclosure. The device 705 may be an example of aspects of a device as described herein. The device 705 may include a receiver 710, a multimedia manager 715, and a transmitter 745. The device 705 may also include a processor. Each of these components may be in communication with one another (e.g., via one or more buses).

The receiver 710 may receive information such as packets, user data, or control information associated with various information channels (e.g., control channels, data channels, and information related to a two-pass omni-directional object detection, etc.). Information may be passed on to other components of the device 705. The receiver 710 may be an example of aspects of the transceiver 820 described with reference to FIG. 8. The receiver 710 may utilize a single antenna or a set of antennas.

The multimedia manager 715, or its sub-components, may be implemented in hardware, code (e.g., software or firmware) executed by a processor, or any combination thereof. If implemented in code executed by a processor, the functions of the multimedia manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The multimedia manager 715, or its sub-components, may be physically located at various positions, including being distributed such that portions of functions are implemented at different physical locations by one or more physical components. In some examples, the multimedia manager 715, or its sub-components, may be a separate and distinct component in accordance with various aspects of the present disclosure. In some examples, the multimedia manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The multimedia manager 715 may include an image component 720, a detection component 725, a score component 730, an orientation component 735, and an intersection component 740. Each of these components may communicate, directly or indirectly, with one another (e.g., via one or more buses).

The image component 720 may receive an image. In some examples, the image component 720 may process the image based on identifying whether to detect object recognition information during a second pass. In some examples, the image component 720 may process the image based on detecting the object recognition information during the second pass. In some examples, the image component 720 may process the image based on one or more of a classification score or an additional classification score. In some examples, the image component 720 may process the image based on an intersection over union satisfying a classification threshold.

The detection component 725 may detect, via a first stage of a cascade neural network, the object recognition information over one or more angular orientations during a first pass, the object recognition information including one or more of a candidate object in the image or a candidate bounding box associated with the candidate object in the image. In some examples, the detection component 725 may identify, via a third stage of the cascade neural network, whether to detect the object recognition information during the second pass based on the confidence score satisfying the threshold. In some examples, identifying whether to detect the object recognition information includes identifying, during the first pass, whether to detect the object recognition information during the second pass. In some examples, the detection component 725 may detect the object recognition information during the second pass based on the adjusting.

In some examples, the detection component 725 may detect, via the first stage of the cascade neural network, the additional object recognition information over one or more angular orientations during the first pass, the additional object recognition information including one or more of additional candidate objects in the image or additional candidate bounding boxes associated with the additional candidate objects in the image. In some examples, detecting the object recognition information during the second pass may be based on the confidence score satisfying the threshold, where processing the image includes detecting the object recognition information during the second pass. In some examples, the candidate object in the image includes a candidate face in the image. In some examples, the one or more object features of the candidate object in the image include one or more facial features associated with the candidate face.

The score component 730 may determine, via a second stage of the cascade neural network, a confidence score associated with one or more of the candidate object in the image, the candidate bounding box associated with the candidate object in the image, or one or more object features of the candidate object in the image, or an orientation of the candidate object in the image, or a combination thereof. In some examples, determining the confidence score includes determining the confidence score during the first pass. In some examples, the score component 730 may determine, via the second stage of the cascade neural network, the confidence score based on one or more of the additional candidate objects in the image or the additional candidate bounding boxes associated with the additional candidate objects in the image.

In some examples, the score component 730 may determine a classification score of the object recognition information including one or more of the candidate object in the image or the candidate bounding box associated with the candidate object in the image. In some examples, the score component 730 may determine an additional classification score of the additional object recognition information including one or more of the additional candidate objects in the image or the additional candidate bounding boxes associated with the additional candidate objects in the image. In some examples, the score component 730 may determine that the confidence score satisfies the threshold.

In some examples, the score component 730 may determine a second confidence score associated with one or more of the candidate object in the image, the candidate bounding box associated with the candidate object in the image, the one or more object features of the candidate object in the image, or an orientation of the candidate object in the image, or a combination thereof during the second pass. In some examples, the score component 730 may compare the confidence score and the second confidence score. In some examples, the score component 730 may output a representation of one or more of the confidence score or the second confidence score based on the comparing, where processing the image includes outputting one or more of the confidence score or the second confidence score. In some examples, the score component 730 may determine that the confidence score satisfies the threshold, where processing the image includes authenticating the object recognition information based on the confidence score satisfying the threshold. In some examples, processing the image includes outputting a representation of the object recognition information based at least in part on the confidence score satisfying the threshold.

The orientation component 735 may adjust, based on the orientation of the candidate object in the image, an orientation of one or more of the candidate bounding box associated with the candidate object in the image or the candidate object in the image. In some examples, the orientation component 735 may adjust an orientation of the candidate bounding box in a first direction. In some examples, the orientation component 735 may adjust an orientation of the candidate object in a second direction different than the first direction. The intersection component 740 may determine an intersection over union by comparing the classification score and the additional classification score. In some examples, the intersection component 740 may determine that the intersection over union satisfies a classification threshold.

The transmitter 745 may transmit signals generated by other components of the device 705. In some examples, the transmitter 745 may be collocated with a receiver 710 in a transceiver component. For example, the transmitter 745 may be an example of aspects of the transceiver 820 described with reference to FIG. 8. The transmitter 745 may utilize a single antenna or a set of antennas.

FIG. 8 shows a diagram of a system 800 including a device 805 that supports a two-pass omni-directional object detection in accordance with aspects of the present disclosure. The device 805 may be an example of or include the components of device 705, or a device as described herein. The device 805 may include components for bi-directional voice and data communications including components for transmitting and receiving communications, including a multimedia manager 810, an I/O controller 815, a transceiver 820, an antenna 825, memory 830, a processor 840, and a coding manager 850. These components may be in electronic communication via one or more buses (e.g., bus 845).

The multimedia manager 810 may receive an image, process the image based on identifying whether to detect the object recognition information during the second pass, detect, via a first stage of a cascade neural network, object recognition information over one or more angular orientations during a first pass, the object recognition information including one or more of a candidate object in the image or a candidate bounding box associated with the candidate object in the image, identify, via a third stage of the cascade neural network, whether to detect the object recognition information during a second pass based on the confidence score satisfying a threshold, and determine, via a second stage of the cascade neural network, a confidence score associated with one or more of the candidate object in the image, the candidate bounding box associated with the candidate object in the image, or one or more object features of the candidate object in the image, or an orientation of the candidate object in the image, or a combination thereof. As detailed above, the multimedia manager 810 including one or more components of the multimedia manager 810 may perform including be a means for performing, either alone or in combination with other elements, one or more operations for supporting a two-pass omni-directional object detection.

The I/O controller 815 may manage input and output signals for the device 805. The I/O controller 815 may also manage peripherals not integrated into the device 805. In some examples, the I/O controller 815 may represent a physical connection or port to an external peripheral. In some examples, the I/O controller 815 may utilize an operating system such as iOS®, ANDROID®, MS-DOS®, MS-WINDOWS®, OS/2®, UNIX®, LINUX®, or another operating system. In other examples, the I/O controller 815 may represent or interact with a modem, a keyboard, a mouse, a touchscreen, or a similar device. In some examples, the I/O controller 815 may be implemented as part of a processor. In some examples, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas. In some examples, the device 805 may include a single antenna 825. However, in some examples, the device 805 may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some examples, the memory 830 may contain, among other things, a basic input/output system (BIOS) which may control basic hardware or software operation such as the interaction with peripheral components or devices.

The code 835 may include instructions to implement aspects of the present disclosure, including instructions to support object detection. The code 835 may be stored in a non-transitory computer-readable medium such as system memory or other type of memory. In some examples, the code 835 may not be directly executable by the processor 840 but may cause a computer (e.g., when compiled and executed) to perform functions described herein.

The processor 840 may include an intelligent hardware device, (e.g., a general-purpose processor, a DSP, a CPU, a microcontroller, ASIC, an FPGA, a programmable logic device, a discrete gate or transistor logic component, a discrete hardware component, or any combination thereof). In some examples, the processor 840 may be configured to operate a memory array using a memory controller. In other examples, a memory controller may be integrated into the processor 840. The processor 840 may be configured to execute computer-readable instructions stored in a memory the memory 830) to cause the device 805 to perform various functions (e.g., functions or tasks supporting a two-pass omni-directional object detection).

Figure 9:
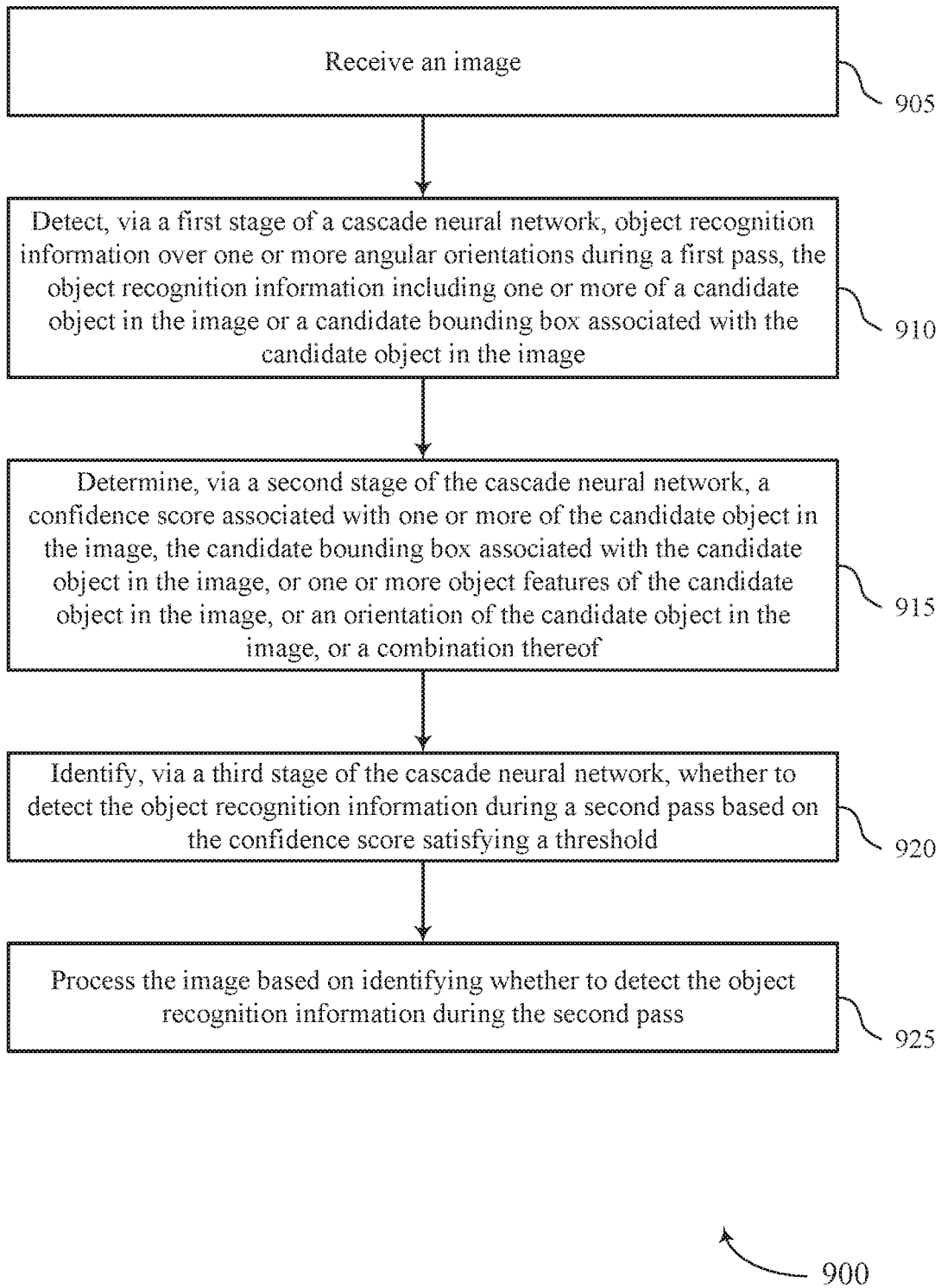
FIG. 9 shows a flowchart illustrating a method that support a two-pass omni-directional object detection in accordance with aspects of the present disclosure.

FIG. 9 shows a flowchart illustrating a method 900 that supports a two-pass omni-directional object detection in accordance with aspects of the present disclosure. The operations of method 900 may be implemented by a device or its components as described herein. For example, the operations of method 900 may be performed by a multimedia manager as described with reference to FIGS. 7 and 8. In some examples, a device may execute a set of instructions to control the functional elements of the device to perform the functions described herein. Additionally or alternatively, a device may perform aspects of the functions described herein using special-purpose hardware.

At 905, the device may receive an image. The operations of 905 may be performed according to the methods described herein. In some examples, aspects of the operations of 905 may be performed by an image component as described with reference to FIG. 7.

At 910, the device may detect, via a first stage of a cascade neural network, object recognition information over one or more angular orientations during a first pass, the object recognition information including one or more of a candidate object in the image or a candidate bounding box associated with the candidate object in the image. The operations of 910 may be performed according to the methods described herein. In some examples, aspects of the operations of 910 may be performed by a detection component as described with reference to FIG. 7.

At 915, the device may determine, via a second stage of the cascade neural network, a confidence score associated with one or more of the candidate object in the image, the candidate bounding box associated with the candidate object in the image, or one or more object features of the candidate object in the image, or an orientation of the candidate object in the image, or a combination thereof. The operations of 915 may be performed according to the methods described herein. In some examples, aspects of the operations of 915 may be performed by a score component as described with reference to FIG. 7.

At 920, the device may identify, via a third stage of the cascade neural network, whether to detect the object recognition information during a second pass based on the confidence score satisfying a threshold. The operations of 920 may be performed according to the methods described herein. In some examples, aspects of the operations of 920 may be performed by a detection component as described with reference to FIG. 7.

At 925, the device may process the image based on identifying whether to detect the object recognition information during the second pass. The operations of 925 may be performed according to the methods described herein. In some examples, aspects of the operations of 925 may be performed by an image component as described with reference to FIG. 7.

It should be noted that the methods described herein describe possible implementations, and that the operations and the steps may be rearranged or otherwise modified and that other implementations are possible. Furthermore, aspects from two or more of the methods may be combined. The described operations performed by a device may be performed in a different order than the order described, or the operations may be performed in different orders or at different times. Some operations may also be left excluded or skipped, or other operations may be added. For example, a device may implement aspects of the techniques described herein as one or more stages, where stages may be implemented separately, may be implemented together to confirm decision making or provide more robustness to omni-directional object detection, and may be implemented in any combination and order based on system needs, device capability, etc.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof if implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise random access memory (RAM), read-only memory (ROM), electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for object detection at a device, comprising:
   receiving an image;
   detecting, via a first stage of a cascade neural network, object recognition information over multiple angular orientations during a first pass, the object recognition information comprising one or more of a candidate object in the image or a candidate bounding box associated with the candidate object in the image, wherein the first stage of the cascade neural network includes a different detection branch for each of the multiple angular orientations;
   determining, via a second stage of the cascade neural network, a confidence score associated with one or more of the candidate object in the image, the candidate bounding box associated with the candidate object in the image, or one or more object features of the candidate object in the image, or an orientation of the candidate object in the image, or a combination thereof;
   identifying, via a third stage of the cascade neural network, whether to perform a second pass of the cascade neural network for the image based at least in part on the confidence score satisfying a threshold, wherein performing the second pass comprises rotating one or more of the multiple angular orientations to detect the object recognition information over the rotated one or more of the multiple angular orientations; and
   processing the image based at least in part on identifying whether to detect the object recognition information during the second pass.

2. The method of claim 1, wherein determining the confidence score comprises determining the confidence score during the first pass.

3. The method of claim 1, wherein identifying whether to perform the second pass of the cascade neural network comprises identifying, during the first pass, whether to detect the object recognition information during the second pass.

4. The method of claim 1, further comprising:
   adjusting, based at least in part on the orientation of the candidate object in the image, an orientation of one or more of the candidate bounding box associated with the candidate object in the image or the candidate object in the image; and
   detecting the object recognition information during the second pass based at least in part on the adjusting,
   wherein processing the image is based at least in part on detecting the object recognition information during the second pass.

5. The method of claim 4, wherein adjusting the orientation of one or more of the candidate bounding box associated with the candidate object in the image or the candidate object in the image comprises:
   adjusting an orientation of the candidate bounding box in a first direction; and
   adjusting the orientation of the candidate object in a second direction different than the first direction.

6. The method of claim 1, further comprising:
   detecting, via the first stage of the cascade neural network, additional object recognition information over the multiple angular orientations during the first pass, the additional object recognition information comprising one or more of additional candidate objects in the image or additional candidate bounding boxes associated with the additional candidate objects in the image,
   wherein determining, via the second stage of the cascade neural network, the confidence score is based at least in part on one or more of the additional candidate objects in the image or the additional candidate bounding boxes associated with the additional candidate objects in the image.

7. The method of claim 6, further comprising:
   determining a classification score of the object recognition information comprising one or more of the candidate object in the image or the candidate bounding box associated with the candidate object in the image; and
   determining an additional classification score of the additional object recognition information comprising one or more of the additional candidate objects in the image or the additional candidate bounding boxes associated with the additional candidate objects in the image,
   wherein processing the image is based at least in part on one or more of the classification score or the additional classification score.

8. The method of claim 7, further comprising:
   determining an intersection over union by comparing the classification score and the additional classification score; and
   determining that the intersection over union satisfies a classification threshold,
   wherein processing the image is based at least in part on the intersection over union satisfying the classification threshold.

9. The method of claim 1, further comprising:
   determining that the confidence score satisfies the threshold; and
   detecting the object recognition information during the second pass based at least in part on the confidence score satisfying the threshold, wherein processing the image comprises detecting the object recognition information during the second pass.

10. The method of claim 9, further comprising:
    determining a second confidence score associated with one or more of the candidate object in the image, the candidate bounding box associated with the candidate object in the image, the one or more object features of the candidate object in the image, or the orientation of the candidate object in the image, or a combination thereof during the second pass;
    comparing the confidence score and the second confidence score; and
    outputting a representation of one or more of the confidence score or the second confidence score based at least in part on the comparing, wherein processing the image comprises outputting one or more of the confidence score or the second confidence score.

11. The method of claim 1, further comprising:
determining that the confidence score satisfies the threshold, wherein processing the image comprises:
authenticating the object recognition information based at least in part on the confidence score satisfying the threshold.

12. The method of claim 1, further comprising:
determining that the confidence score satisfies the threshold, wherein processing the image comprises:
outputting a representation of the object recognition information based at least in part on the confidence score satisfying the threshold.

13. The method of claim 1, wherein:
the candidate object in the image comprises a candidate face in the image; and
the one or more object features of the candidate object in the image comprise one or more facial features associated with the candidate face.

14. An apparatus for object detection, comprising:
a processor,
memory coupled with the processor; and
instructions stored in the memory and executable by the processor to cause the apparatus to:
receive an image;
detect, via a first stage of a cascade neural network, object recognition information over multiple angular orientations during a first pass, the object recognition information comprising one or more of a candidate object in the image or a candidate bounding box associated with the candidate object in the image, wherein the first stage of the cascade neural network includes a different detection branch for each of the multiple angular orientations;
determine, via a second stage of the cascade neural network, a confidence score associated with one or more of the candidate object in the image, the candidate bounding box associated with the candidate object in the image, or one or more object features of the candidate object in the image, or an orientation of the candidate object in the image, or a combination thereof;
identify, via a third stage of the cascade neural network, whether to perform a second pass of the cascade neural network for the image based at least in part on the confidence score satisfying a threshold, wherein performing the second pass comprises rotating one or more of the multiple angular orientations to detect the object recognition information over the rotated one or more of the multiple angular orientations; and
process the image based at least in part on identifying whether to detect the object recognition information during the second pass.

15. The apparatus of claim 14, wherein the instructions to determine the confidence score are executable by the processor to cause the apparatus to determine the confidence score during the first pass.

16. The apparatus of claim 14, wherein the instructions to identify whether to perform the second pass of the cascade neural network are executable by the processor to cause the apparatus to:
identify, during the first pass, whether to detect the object recognition information during the second pass.

17. The apparatus of claim 14, wherein the instructions are further executable by the processor to cause the apparatus to:
adjust, based at least in part on the orientation of the candidate object in the image, an orientation of one or more of the candidate bounding box associated with the candidate object in the image or the candidate object in the image; and
detect the object recognition information during the second pass based at least in part on the adjusting, wherein the instructions to process the image are executable by the processor based at least in part on detecting the object recognition information during the second pass.

18. The apparatus of claim 17, wherein the instructions to adjust the orientation of one or more of the candidate bounding box associated with the candidate object in the image or the candidate object in the image are executable by the processor to cause the apparatus to:
adjust an orientation of the candidate bounding box in a first direction; and
adjust the orientation of the candidate object in a second direction different than the first direction.

19. The apparatus of claim 14, wherein the instructions are further executable by the processor to cause the apparatus to:
determine that the confidence score satisfies the threshold, wherein the instructions to detect the object recognition information during the second pass are executable by the processor based at least in part on the confidence score satisfying the threshold, wherein the instructions to process the image are executable by the processor to cause the apparatus to detect the object recognition information during the second pass.

20. An apparatus for object detection, comprising:
means for receiving an image;
means for detecting, via a first stage of a cascade neural network, object recognition information over multiple angular orientations during a first pass, the object recognition information comprising one or more of a candidate object in the image or a candidate bounding box associated with the candidate object in the image, wherein the first stage of the cascade neural network includes a different detection branch for each of the multiple angular orientations;
means for determining, via a second stage of the cascade neural network, a confidence score associated with one or more of the candidate object in the image, the candidate bounding box associated with the candidate object in the image, or one or more object features of the candidate object in the image, or an orientation of the candidate object in the image, or a combination thereof;
means for identifying, via a third stage of the cascade neural network, whether to perform a second pass of the cascade neural network for the image based at least in part on the confidence score satisfying a threshold, wherein performing the second pass comprises rotating one or more of the multiple angular orientations to detect the object recognition information over the rotated one or more of the multiple angular orientations; and
means for processing the image based at least in part on identifying whether to detect the object recognition information during the second pass.

* * * * *